(12) United States Patent
Yu et al.

(10) Patent No.: US 12,247,760 B2
(45) Date of Patent: Mar. 11, 2025

(54) ENERGY RECOVERY VENTILATION UNIT WITH A DEHUMIDIFICATION SYSTEM

(71) Applicant: Therma-Stor LLC, Madison, WI (US)

(72) Inventors: Weizhong Yu, Cottage Grove, WI (US); David Treleven, Raleigh, NC (US); Todd R. DeMonte, Sun Prairie, WI (US); Kevin Lawrence Askling, Madison, WI (US); Timothy S. O'Brien, DeForest, WI (US); Jenee LaPlace Mobley, Fuquay Varina, NC (US); Robert John Motiff, Columbus, WI (US)

(73) Assignee: THERMA-STOR LLC, Madison, WI (US)

( * ) Notice: Subject to any disclaimer, the term of this patent is extended or adjusted under 35 U.S.C. 154(b) by 60 days.

(21) Appl. No.: 17/656,852

(22) Filed: Mar. 28, 2022

(65) Prior Publication Data
US 2023/0304680 A1    Sep. 28, 2023

(51) Int. Cl.
| | |
|---|---|
| *F24F 3/153* | (2006.01) |
| *F24F 3/14* | (2006.01) |
| *F24F 12/00* | (2006.01) |
| *F25B 5/04* | (2006.01) |
| *F25B 6/04* | (2006.01) |
| *F25B 40/02* | (2006.01) |
| *F25B 40/04* | (2006.01) |
| *F25B 41/39* | (2021.01) |

(52) U.S. Cl.
CPC ............ *F24F 3/153* (2013.01); *F24F 3/1405* (2013.01); *F24F 12/006* (2013.01); *F25B 5/04* (2013.01); *F25B 6/04* (2013.01); *F25B 40/02* (2013.01); *F25B 40/04* (2013.01); *F25B 41/39* (2021.01); *F24F 2003/1452* (2013.01); *F24F 2012/007* (2013.01)

(58) Field of Classification Search
CPC .. F24F 3/1405; F24F 12/006; F24F 2012/007; F24F 2003/1452
See application file for complete search history.

(56) References Cited

U.S. PATENT DOCUMENTS

| | | | | |
|---|---|---|---|---|
| 4,841,733 | A | * | 6/1989 | Dussault ............... F24F 5/0071 165/223 |
| 5,024,263 | A | * | 6/1991 | Laine ...................... F24F 11/30 165/283 |

(Continued)

OTHER PUBLICATIONS

Zhang et al, Heat and Mass transfer in membrane-based energy recovery ventilator, Journal of Membrane Science (Year: 1999).*

*Primary Examiner* — Christopher R Zerphey
(74) *Attorney, Agent, or Firm* — Baker Botts L.L.P.

(57) ABSTRACT

An energy recovery ventilation unit includes an energy recovery ventilation core and a dehumidification system comprising an evaporation unit and a condensing unit. The energy recovery ventilation core receives a first and second airflow and discharges the first and second airflow after the first and second airflow experience heat and mass transfer. The evaporation unit generates a first output airflow comprising a lower relative humidity than the first airflow and directs the first output airflow into a building. The condensing unit generates a second output airflow at a higher temperature than the second airflow and discharges the second output airflow to an unconditioned space.

20 Claims, 10 Drawing Sheets

(56) References Cited

U.S. PATENT DOCUMENTS

| | | | | |
|---|---|---|---|---|
| 5,333,470 | A * | 8/1994 | Dinh | F24F 12/002 |
| | | | | 62/119 |
| 5,816,315 | A * | 10/1998 | Stark | F24F 3/153 |
| | | | | 62/93 |
| 8,220,277 | B2 * | 7/2012 | Dieckmann | F24F 1/0323 |
| | | | | 62/93 |
| 8,743,542 | B2 * | 6/2014 | Kok | H05K 7/20754 |
| | | | | 361/696 |
| 10,168,058 | B2 * | 1/2019 | Tucker | F25B 5/04 |
| 10,845,069 | B2 * | 11/2020 | Sloan | F25B 6/04 |
| 10,921,002 | B2 * | 2/2021 | Dingle | F25B 6/04 |
| 10,955,148 | B2 * | 3/2021 | Dingle | F25B 5/04 |
| 11,573,015 | B2 * | 2/2023 | Yu | F28D 1/024 |
| 11,573,016 | B2 * | 2/2023 | Yu | F25B 6/04 |
| 2007/0209780 | A1 * | 9/2007 | Bichler | F28D 7/14 |
| | | | | 165/60 |
| 2010/0300123 | A1 * | 12/2010 | Park | B01D 53/261 |
| | | | | 62/271 |
| 2011/0036541 | A1 * | 2/2011 | Takada | F24F 12/006 |
| | | | | 165/59 |
| 2015/0159920 | A1 * | 6/2015 | Ha | F25B 5/02 |
| | | | | 62/426 |
| 2020/0011549 | A1 * | 1/2020 | Spargo | F24F 3/147 |
| 2021/0341155 | A1 * | 11/2021 | Brill | F25B 6/02 |
| 2022/0003435 | A1 * | 1/2022 | Ge | F24F 3/147 |

* cited by examiner

ENERGY RECOVERY VENTILATION UNIT WITH A DEHUMIDIFICATION SYSTEM

TECHNICAL FELD

This invention relates generally to dedicated outdoor air systems and more particularly to an energy recovery ventilation unit with a dehumidification system.

BACKGROUND OF THE INVENTION

In certain situations, it is desirable to reduce the humidity of air within a structure. It is also desirable to periodically ventilate the air within the structure to improve indoor air quality. Current dedicated outdoor air systems consist of multiple units that individually address each of these procedures, where these existing systems waste energy to remove heat or moisture from a conditioned flow discharged by one of the units within the system.

SUMMARY OF THE INVENTION

According to embodiments of the present disclosure, disadvantages and problems associated with previous systems may be reduced or eliminated.

In certain embodiments, an energy recovery ventilation unit comprises a housing comprising a plurality of side panels, a first panel, and a second panel. The energy recovery ventilation unit further comprises a first panel inlet and a first panel outlet, wherein each of the first panel inlet and the first panel outlet are disposed at one of the plurality of side panels, and wherein the first panel inlet is configured to introduce a first airflow into the housing. The energy recovery ventilation unit further comprises a second panel inlet and a second panel outlet, wherein each of the second panel inlet and the second panel outlet are disposed at one of the plurality of side panels opposite to the first panel inlet and the first panel outlet, wherein the second panel inlet is configured to introduce a second airflow into the housing. The energy recovery ventilation unit further comprises an energy recovery ventilation core disposed within the housing. The energy recovery ventilation core comprises a first side comprising a first inlet operable to receive at least a portion of the first airflow, a second side comprising a second inlet operable to receive at least a portion of the second airflow, a third side comprising a first outlet operable to discharge the second airflow after heat transfers between the second airflow and the first airflow within the energy recovery ventilation core, and a fourth side comprising a second outlet operable to discharge the first airflow after heat transfers between the second airflow and the first airflow within the energy recovery ventilation core. The energy recovery ventilation unit further comprises an evaporation unit disposed within the housing.

The evaporation unit comprises a primary metering device, a secondary metering device, and a secondary evaporator. The secondary evaporator is operable to receive a flow of refrigerant from the primary metering device, receive the discharged second airflow and the first airflow, and transfer heat from the discharged second airflow and the first airflow to the flow of refrigerant as the discharged second airflow and the first airflow passes through the secondary evaporator to generate a first output airflow. The evaporation unit further comprises a primary evaporator operable to receive the flow of refrigerant from the secondary metering device, receive the first output airflow from the secondary evaporator, and transfer heat from the first output airflow to the flow of refrigerant as the first output airflow passes through the primary evaporator. The evaporation unit further comprises a secondary condenser operable to receive the flow of refrigerant from the secondary evaporator, receive the first output airflow from the primary evaporator, and transfer heat from the flow of refrigerant to the first output airflow as the first output airflow passes through the secondary condenser.

The energy recovery ventilation unit further comprises a condensing unit, disposed within the housing, that comprises a compressor. The compressor is operable to receive the flow of refrigerant from the primary evaporator and provide the flow of refrigerant to a primary condenser, wherein the flow of refrigerant provided to the primary condenser comprising a higher pressure than the flow of refrigerant received at the compressor. The condensing unit further comprises the primary condenser operable to receive the flow of refrigerant from the compressor, receive the discharged first airflow and the second airflow, and transfer heat from the flow of refrigerant to the discharged first airflow and the second airflow as the discharged first airflow and the second airflow passes through the primary condenser to generate a second output airflow.

In certain embodiments, an energy recovery ventilation unit comprises a housing comprising a plurality of side panels. The energy recovery ventilation unit further comprises a first panel inlet configured to introduce a first airflow into the housing and a first set of dampers disposed downstream of the first panel inlet. The energy recovery ventilation unit further comprises a second panel inlet disposed opposite to the first panel inlet and configured to introduce a second airflow into the housing and a second set of dampers disposed downstream of the second panel inlet, wherein each of the first set of dampers and the second set of dampers comprises a core damper and a bypass damper. The energy recovery ventilation unit further comprises an energy recovery ventilation core disposed between the first set of dampers and the second set of dampers. The energy recovery ventilation core comprises a first side comprising a first inlet operable to receive at least a portion of the first airflow, a second side comprising a second inlet operable to receive at least a portion of the second airflow, a third side comprising a first outlet operable to discharge the second airflow after heat transfers between the second airflow and the first airflow within the energy recovery ventilation core, and a fourth side comprising a second outlet operable to discharge the first airflow after heat transfers between the second airflow and the first airflow within the energy recovery ventilation core. The energy recovery ventilation unit further comprises a first differential pressure sensor disposed downstream of the discharged second airflow and a second differential pressure sensor disposed downstream of the discharged first airflow. The energy recovery ventilation unit further comprises an evaporation unit disposed within the housing and below the first set of dampers and a condensing unit disposed within the housing and below the second set of dampers. During a first mode of operation, the first set of dampers is in a first position configured to inhibit the flow of the first airflow from the first panel inlet, and the second set of dampers is in a first position configured to inhibit the flow of the second airflow from the second panel inlet. During a second mode of operation, at least one of the first set of dampers and the second set of dampers is actuated to a second position wherein at least one of the first airflow and the second airflow flows to any one of the energy recovery ventilation core, the evaporation unit, and the condensing unit.

Certain embodiments of the present disclosure may provide one or more technical advantages. For example, certain embodiments include a unit comprising both an energy recovery ventilation core and a dehumidification system. This unit may allow for ventilation in all weather conditions without concern for increasing the relative humidity within a building. The dehumidification system may remove the moisture from an airflow after flowing through and experiencing heat and mass transfer in the energy recovery ventilation core and before the airflow is discharged back into a building.

Certain embodiments further include sets of dampers operable to transition between positions to either allow or inhibit an airflow through the energy recovery ventilation unit. This configuration can dynamically control supply airflows from inside and outside a building. This may provide balanced ventilation when a building's airflow becomes unbalanced.

As another example, certain embodiments include two evaporators, two condensers, and two metering devices that utilize a closed refrigeration loop. This configuration causes part of the refrigerant within the system to evaporate and condense twice in one refrigeration cycle, thereby increasing the compressor capacity over typical systems without adding any additional power to the compressor. This, in turn, increases the overall efficiency of the system by providing more dehumidification per kilowatt of power used. The lower humidity of the output airflow may allow for increased drying potential, which may be beneficial in certain applications (e.g., fire and flood restoration).

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

In certain situations, it is desirable to reduce the humidity of air within a structure and to periodically ventilate the air within the structure to improve indoor air quality. Current dedicated outdoor air systems, however, have proven inadequate or inefficient in various respects. These systems can include multiple individual units that waste energy to remove heat and moisture from a conditioned airflow discharged by one of the units within the system. Alternatively, these systems may not be able to reduce the moisture of an incoming airflow being used to ventilate the air within a building.

To address the inefficiencies and other issues with current dedicated outdoor air systems, the disclosed embodiments provide an energy recovery ventilation unit comprising an energy recovery ventilation core and a dehumidification system. Operating the energy recovery ventilation unit with the dehumidification system provides an all-in-one solution for balanced ventilation in all weather conditions. For example, an outside environment may have a higher temperature and relative humidity than the air inside a building. Typical dedicated outdoor air systems would operate to passively ventilate the inside air with the outside air, thereby increasing the temperature and relative humidity of the newer inside air after ventilation. The disclosed embodiments may reduce the moisture and temperature of the incoming air from the outside environment with the combination of the energy recovery ventilation core and the dehumidification system. The disclosed embodiments may further eliminate the need for the following equipment for a building and provide equal or better performance: bath exhaust fans, a dehumidifier, and make-up air systems. This may further reduce the amount of ductwork, control systems, penetrations in the building, time required for installation, and space required for equipment.

Further, the dehumidification system includes a secondary evaporator and a secondary condenser, which causes part of the refrigerant within the multi-stage system to evaporate and condense twice in one refrigeration cycle. This increases the compressor capacity over typical systems without adding any additional power to the compressor. This, in turn, increases the overall efficiency of the system by providing more dehumidification per kilowatt of power used.

Figure 1:
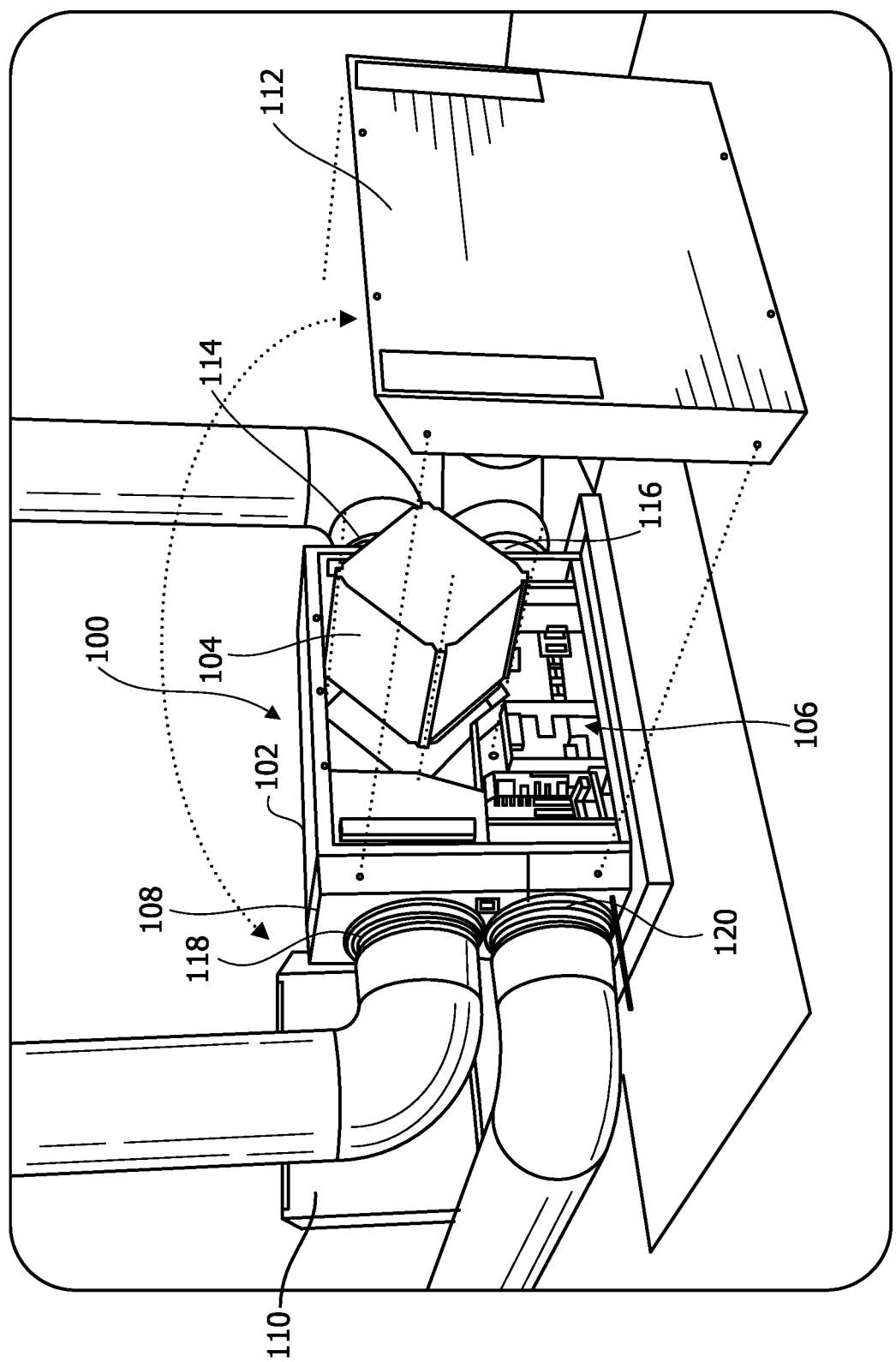
FIG. 1 illustrates an example energy recovery ventilation unit, according to certain embodiments.

FIG. 1 illustrates an example energy recovery ventilation unit 100 for replacing stale air within a structure (for example, a building) with fresh air from an external environment, according to certain embodiments. The structure may include all or a portion of a building or other suitable enclosed space, such as an apartment building, a hotel, an office space, a commercial building, or a private dwelling (e.g., a house). Energy recovery ventilation unit 100 may comprise a housing 102, an energy recovery ventilation (ERV) core 104, and a dehumidification system 106. The housing 102 may be operable to house and protect the internal components of the energy recovery ventilation unit 100 from an external environment. The housing 102 may comprise any suitable size, height, shape, and any combinations thereof. Further, the housing 102 may comprise any suitable materials, such as metals, nonmetals, polymers, composites, and any combinations thereof.

As illustrated, the housing 102 may comprise a plurality of side panels 108, a first panel 110, and a second panel 112. The plurality of side panels 108 may be coupled together through any suitable means to form the housing 102. As shown in FIG. 1, the plurality of side panels 108 may form an open, rectangular shape and be configured to receive the first panel 110 and second panel 112 in order to seal and close the housing 102. The first panel 110 and the second panel 112 may couple to opposite sides of the plurality of side panels 108. In embodiments, the first panel 110 and the second panel 112 may be interchangeably attached to the plurality of side panels 108. For example, either the first panel 110 or the second panel 112 may be disposed at one side of the plurality of side panels 108 and the remaining one of the first panel 110 or the second panel 112 may be disposed at an opposite side of the plurality of side panels 108.

The housing 102 may further comprise a first panel inlet 114 and a first panel outlet 116 each disposed at one of the plurality of side panels 108. The first panel inlet 114 is configured to introduce a first airflow into the housing 102, and the first panel outlet 116 is configured to discharge a first output airflow from the housing 102. The first airflow may be received from inside the structure of which the energy recovery ventilation unit 100 is coupled (for example, an airflow from inside a building). The first output airflow may be discharged to be introduced back to an interior of the structure.

The housing 102 may further comprise a second panel inlet 118 and a second panel outlet 120 each disposed at one of the plurality of side panels 108 opposite to the first panel inlet 114 and the first panel outlet 116. Similar to the first panel inlet and outlets 114, 116, the second panel inlet is configured to introduce a second airflow into the housing 102, and the second panel outlet 120 is configured to discharge a second output airflow from the housing 102. The second airflow may be received from an external environment (i.e., outside). The second output airflow may be discharged back to the external environment.

As illustrated, both the ERV core 104 and the dehumidification system 106 may be disposed within the housing 102. The ERV core 104 may comprise a plurality of sides operable to either receive airflows from the first panel inlet 114 and second panel inlet 118 or discharge airflows to the dehumidification system 106. The ERV core 104 may facilitate heat transfer and mass transfer (for example, moisture) between the first and second airflows. In one or more embodiments, a suitable heat recovery core may be used in the energy recovery ventilation unit 100, wherein the heat recovery core is operable to facilitate heat transfer without a transfer of moisture between airflows. The term "ERV core 104" may herein refer to either a heat recovery core or an energy recovery ventilation core for the energy recovery ventilation unit 100. In embodiments, a user may not want the air to be recirculated back into the structure (for example, the first output airflow) with a higher moisture content. Operation of the dehumidification system 106 may lower the level of moisture content present in the first output airflow before the first output airflow is discharged from the energy recovery ventilation unit 100 and introduced back into the structure. The dehumidification system 106 may be a split system wherein an evaporation unit is coupled to a remote condensing unit. The split configuration of dehumidification system 106 may allow heat from the cooling and dehumidification process to be rejected outdoors or to an unconditioned space (e.g., external to a space being dehumidified), such as to the external environment. Both ERV core 104 and dehumidification system 106 are described in more detail below in FIGS. 4-5.

Figure 2:
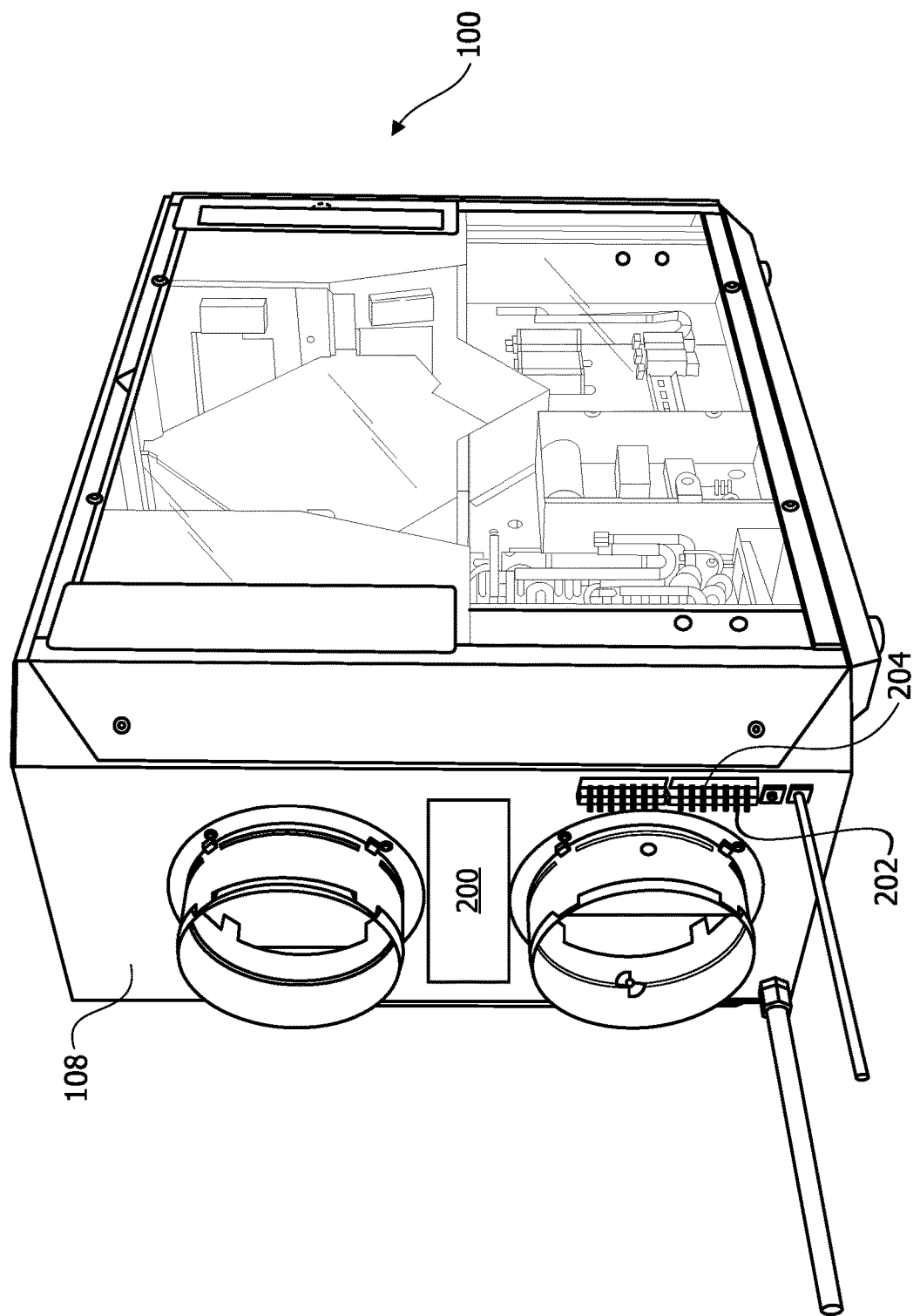
FIG. 2 illustrates an isolated view of the example energy recovery ventilation unit of FIG. 1, according to certain embodiments.

FIG. 2 illustrates an isolated view of the example energy recovery ventilation unit 100 of FIG. 1, according to certain embodiments of the present disclosure. Energy recovery ventilation unit 100 may comprise a controller 200 and leads 202. Controller 200 may receive signals from an external source and instruct internal components of the energy recovery ventilation unit 100 to operate. In embodiments, the controller 200 may be communicatively coupled to each internal component of the energy recovery ventilation unit 100 and transmit a signal instructing at least one of the internal components to operate based on a received signal from the external source and/or based on a received signal from within the energy recovery ventilation unit 100. For example, there may be a sensor disposed within the energy recovery ventilation unit 100 operable to measure a temperature of an airflow. The controller 200 may receive a temperature measurement of the airflow and transmit an instruction to the dehumidification system 106 (referring to FIG. 1) based on the received temperature measurement. As another example, there may be a pressure differential from inside the structure fluidly coupled to the energy recovery ventilation unit 100 (for example, a kitchen exhaust hood may be discharging air external to the structure). A signal may be sent to the leads 202 connected to the controller 200, wherein the leads 202 operably couple the controller 200 to external sensors. The leads 202 are connected to the controller 200 via a terminal 204 disposed at one of the plurality of sides 108. The controller 200 may then instruct a component of the energy recovery ventilation unit 100, such as one or more fans, to operate to supply additional air into the structure in view of the pressure differential. Controller 200 is described in more detail below in FIG. 3.

Although a particular implementation of energy recovery ventilation unit 100 is illustrated and primarily described, the present disclosure contemplates any suitable implementation of energy recovery ventilation unit 100, according to particular needs. Moreover, although various components of energy recovery ventilation unit 100 have been depicted as being located at particular positions, the present disclosure contemplates those components being positioned at any suitable location, according to particular needs.

Figure 3:
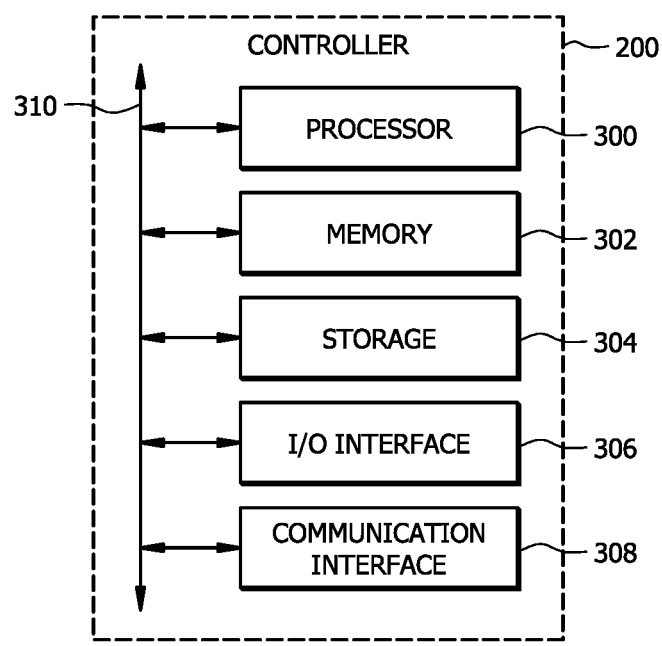
FIG. 3 illustrates an example controller that may be used by the energy recovery ventilation unit of FIG. 1, according to certain embodiments.

FIG. 3 illustrates an example controller 200. In particular embodiments, one or more controllers 200 perform one or more steps of one or more methods described or illustrated herein. In particular embodiments, one or more controllers 200 provide functionality described or illustrated herein. In particular embodiments, software running on one or more controllers 200 performs one or more steps of one or more methods described or illustrated herein or provides functionality described or illustrated herein. Particular embodiments include one or more portions of one or more controllers 200. Herein, reference to a controller may encompass a computing device, and vice versa, where appropriate. Moreover, reference to a controller may encompass one or more controllers, where appropriate.

This disclosure contemplates any suitable number of controllers 200. This disclosure contemplates controller 200 taking any suitable physical form. As example and not by way of limitation, controller 200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, controller 200 may include one or more controllers 200; be unitary or distributed; span multiple locations; span multiple machines; span multiple data centers; or reside in a cloud, which may include one or more cloud components in one or more networks. Where appropriate, one or more controllers 200 may perform without substantial spatial or temporal limitation one or more steps of one or more methods described or illustrated herein. As an example and not by way of limitation, one or more controllers 200 may perform in real time or in batch mode one or more steps of one or more methods described or illustrated herein. One or more controllers 200 may perform at different times or at different locations one or more steps of one or more methods described or illustrated herein, where appropriate.

In particular embodiments, controller 200 includes a processor 300, memory 302, storage 304, an input/output (I/O) interface 306, a communication interface 308, and a bus 310. Although this disclosure describes and illustrates a particular computer system having a particular number of particular components in a particular arrangement, this disclosure contemplates any suitable computer system having any suitable number of any suitable components in any suitable arrangement.

In particular embodiments, processor 300 includes hardware for executing instructions, such as those making up a computer program. As an example and not by way of limitation, to execute instructions, processor 300 may retrieve (or fetch) the instructions from an internal register, an internal cache, memory 302, or storage 304; decode and execute them; and then write one or more results to an internal register, an internal cache, memory 302, or storage 304. In particular embodiments, processor 300 may include one or more internal caches for data, instructions, or addresses. This disclosure contemplates processor 300 including any suitable number of any suitable internal caches, where appropriate. As an example and not by way of limitation, processor 300 may include one or more instruction caches, one or more data caches, and one or more translation lookaside buffers (TLBs). Instructions in the instruction caches may be copies of instructions in memory 302 or storage 304, and the instruction caches may speed up retrieval of those instructions by processor 300. Data in the data caches may be copies of data in memory 302 or storage 304 for instructions executing at processor 300 to operate on; the results of previous instructions executed at processor 300 for access by subsequent instructions executing at processor 300 or for writing to memory 302 or storage 304; or other suitable data. The data caches may speed up read or write operations by processor 300. The TLBs may speed up virtual-address translation for processor 300. In particular embodiments, processor 300 may include one or more internal registers for data, instructions, or addresses. This disclosure contemplates processor 300 including any suitable number of any suitable internal registers, where appropriate. Where appropriate, processor 300 may include one or more arithmetic logic units (ALUs); be a multi-core processor; or include one or more processors 300. Although this disclosure describes and illustrates a particular processor, this disclosure contemplates any suitable processor.

In particular embodiments, memory 302 includes main memory for storing instructions for processor 300 to execute or data for processor 300 to operate on. As an example and not by way of limitation, controller 200 may load instructions from storage 304 or another source (such as, for example, another controller 200) to memory 302. Processor 300 may then load the instructions from, memory 302 to an internal register or internal cache. To execute the instructions, processor 300 may retrieve the instructions from the internal register or internal cache and decode them. During or after execution of the instructions, processor 300 may write one or more results (which may be intermediate or final results) to the internal register or internal cache. Processor 300 may then write one or more of those results to memory 302. In particular embodiments, processor 300 executes only instructions in one or more internal registers or internal caches or in memory 302 (as opposed to storage 304 or elsewhere) and operates only on data in one or more internal registers or internal caches or in memory 302 (as opposed to storage 304 or elsewhere). One or more memory buses (which may each include an address bus and a data bus) may couple processor 300 to memory 302. Bus 310 may include one or more memory buses, as described below. In particular embodiments, one or more memory management units (MMUs) reside between processor 300 and memory 302 and facilitate accesses to memory 302 requested by processor 300. In particular embodiments, memory 302 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 302 may include one or more memories 302, where appropriate. Although this disclosure describes and illustrates particular memory, this disclosure contemplates any suitable memory.

In particular embodiments, storage 304 includes mass storage for data or instructions. As an example and not by way of limitation, storage 304 may include a hard, disk drive (HDD), a floppy disk drive, flash memory, an optical disc, a magneto-optical disc, magnetic tape, or a Universal Serial Bus (USB) drive or a combination of two or more of these. Storage 304 may include removable or non-removable (or fixed) media, where appropriate. Storage 304 may be internal or external to controller 200, where appropriate. In particular embodiments, storage 304 is non-volatile, solid-state memory. In particular embodiments, storage 304 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 304 taking any suitable physical form. Storage 304 may include one or more storage control units facilitating communication between processor 300 and storage 304, where appropriate. Where appropriate, storage 304 may include one or more storages 304. Although this disclosure describes and illustrates particular storage, this disclosure contemplates any suitable storage.

In particular embodiments, I/O interface 306 includes hardware, software, or both, providing one or more interfaces for communication between controller 200 and one or more I/O devices. Controller 200 may include one or more of these I/O devices, where appropriate. One or more of these I/O devices may enable communication between a person and controller 200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 306 for them. Where appropriate, I/O interface 306 may include one or more device or software drivers enabling processor 300 to drive one or more of these I/O devices. I/O interface 306 may include one or more I/O interfaces 306, where appropriate. Although this disclosure describes and illustrates a particular I/O interface, this disclosure contemplates any suitable I/O interface.

In particular embodiments, communication interface 308 includes hardware, software, or both providing one or more interfaces for communication (such as, for example, packetbased communication) between controller 200 and one or more other controllers 200 or one or more networks. As an example and not by way of limitation, communication interface 308 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 308 for it. As an example and not by way of limitation, controller 200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, controller 200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Controller 200 may include any suitable communication interface 308 for any of these networks, where appropriate. Communication interface 308 may include one or more communication interfaces 308, where appropriate. Although this disclosure describes and illustrates a particular communication interface; this disclosure contemplates any suitable communication interface.

In particular embodiments, bus 310 includes hardware, software, or both coupling components of controller 200 to each other. As an example and not by way of limitation, bus 310 may include an Accelerated Graphics Port (AGP) or other graphics bus, an Enhanced Industry Standard Architecture (EISA) bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 310 may include one or more buses 310, where appropriate. Although this disclosure describes and illustrates a particular bus, this disclosure contemplates any suitable bus or interconnect.

Figure 4:
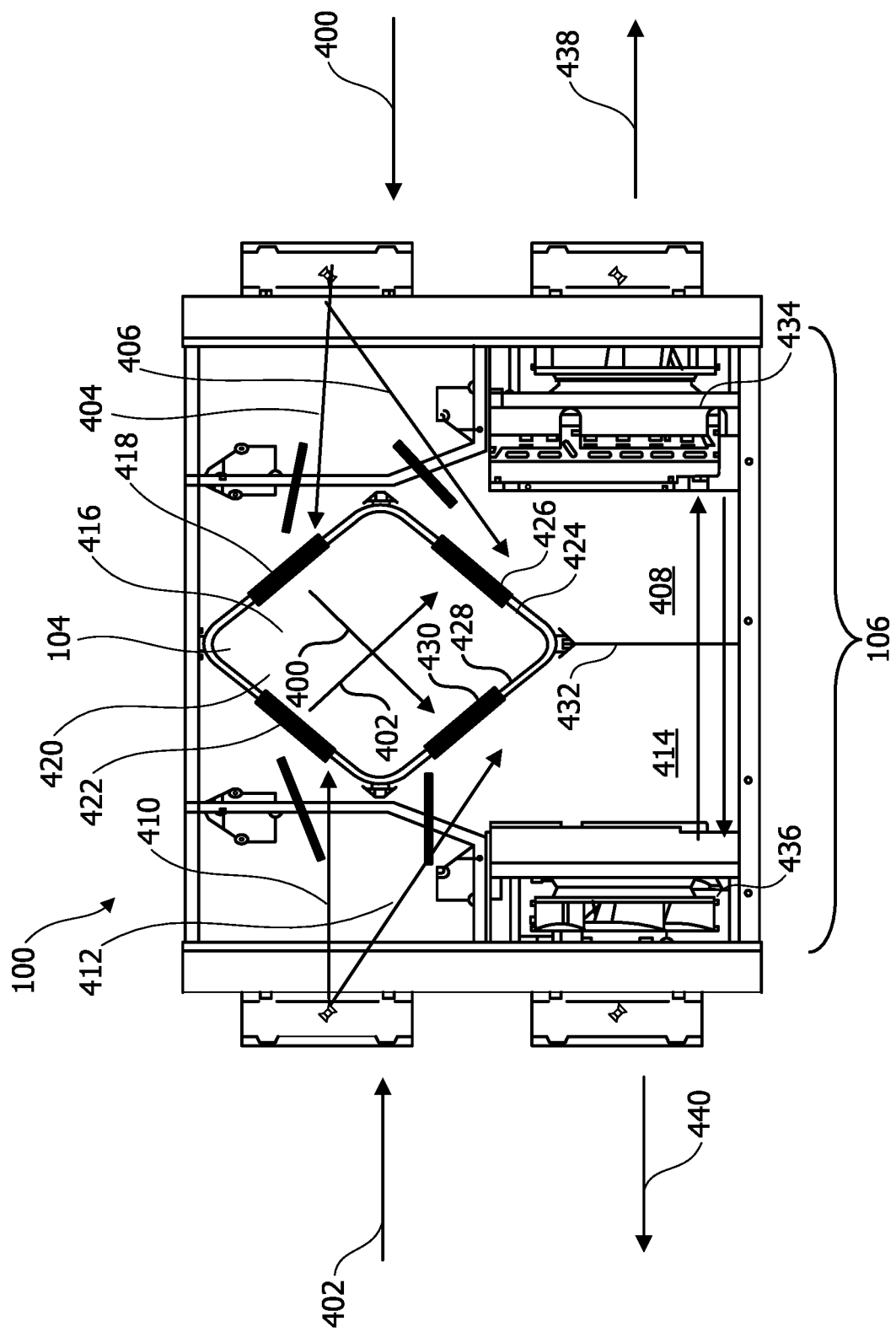
FIG. 4 illustrates a cross-section of the example energy recovery ventilation unit of FIG. 1, according to certain embodiments.

FIG. 4 illustrates a cross-section of the example energy recovery ventilation unit 100 of FIG. 1, according to certain embodiments. During operations, a first airflow 400 may be introduced into the energy recovery ventilation unit 100 from the structure, and a second airflow 402 may be introduced into the energy recovery ventilation unit 100 from an external environment. Depending on a mode of operation, the first airflow 400 and/or the second airflow 402 may be split into separate portions. For example, the first airflow 400 may split into a first portion 404 directed towards the ERV core 104 and a second portion 406 directed towards a first lower section 408 of the energy recovery ventilation unit 100. In other embodiments, the first airflow 400 may remain whole and flow to either the ERV core 104 or the first lower section 408. Similar to the first airflow, the second airflow 402 may split into a first portion 410 directed towards the ERV core 104 and a second portion 412 directed towards a second lower section 414 of the energy recovery ventilation unit 100. In other embodiments, the second airflow 402 may remain whole and flow to either the ERV core 104 or the second lower section 414.

The ERV core 104 may facilitate passive heat and mass transfer between at least the first portion 404 of the first airflow 400 and the first portion 410 of the second airflow 402. In certain embodiments, the ERV core 104 may facilitate passive heat and mass transfer between the entire first airflow 400 and second airflow 402, depending on the mode of operation of the energy recovery ventilation unit 100. As illustrated, the ERV core 104 may comprise a first side 416 comprising a first inlet 418 operable to receive at least a portion of the first airflow 400 (for example, first portion 404) and a second side 420 comprising a second inlet 422 operable to receive at least a portion of the second airflow 402 (for example, first portion 410). The ERV core 104 may further comprise a third side 424 comprising a first outlet 426 operable to discharge the second airflow 402 after heat and mass transfers between the second airflow 402 and the first airflow 400 within the ERV core 104 and a fourth side 428 comprising a second outlet 430 operable to discharge the first airflow 400 after heat and mass transfers between the second airflow 402 and the first airflow 400 within the ERV core 104.

As illustrated in FIG. 4, the ERV core 104 may discharge the second 402 airflow into the first lower section 408 and the first airflow 400 into the second lower section 414. The first lower section 408 and the second lower section 414 may be disposed adjacent to each other and divided by a partition 432. The dehumidification system 106 may be disposed throughout the first and second lower sections 408, 414. The dehumidification system 106 may receive an airflow from within the structure fluidly coupled to the energy recovery ventilation unit 100 (such as the first airflow 400), reduce the moisture in the received airflow, and supply dehumidified air back to the structure.

In general, dehumidification system 106 is a split system comprising an evaporation unit 434 coupled to a remote condensing unit 436. Remote condensing unit 436 may facilitate the functions of evaporation unit 434 by processing a flow of refrigerant as part of a refrigeration cycle. The flow of refrigerant may include any suitable cooling material, such as R410a refrigerant. In certain embodiments, condensing unit 436 may receive the flow of refrigerant vapor from evaporation unit 434 via a refrigerant line. Condensing unit 436 may pressurize the flow of refrigerant, thereby increasing the temperature of the refrigerant. Condensing unit 436 may then cool the pressurized refrigerant by facilitating heat transfer from the flow of refrigerant to the ambient air (such as the discharged first airflow 400 from the ERV core 104). In certain embodiments, condensing unit 436 may utilize a heat exchanger, such as a microchannel heat exchanger to remove heat from the flow of refrigerant. Remote condensing unit 436 may include a fan that draws the ambient air for use in cooling the flow of refrigerant. In certain embodiments, the speed of this fan is modulated to effectuate desired operating characteristics. An illustrative embodiment of an example condensing unit is shown, for example, in FIG. 5 (described in further detail below).

After being cooled and condensed to liquid by condensing unit 436, the flow of refrigerant may travel by a refrigerant line to evaporation unit 434. In certain embodiments, the flow of refrigerant may be received by an expansion device (described in further detail below) that reduces the pressure of the flow of refrigerant, thereby reducing the temperature of the flow of refrigerant. Evaporation unit 434 may receive the flow of refrigerant from the expansion device and use the flow of refrigerant to dehumidify and cool an incoming airflow (such as the discharged second airflow 402 from the ERV core 104). The flow of refrigerant may then flow back to remote condensing unit 436 and repeat this cycle.

In certain embodiments, evaporation unit 434 may be installed in series with an air mover. An air mover may include a fan that blows air from one location to another. An air mover may facilitate distribution of outgoing air from evaporation unit 434 to various parts of structure. An air mover and evaporation unit 434 may have separate return inlets from which air is drawn. In certain embodiments, outgoing air from evaporation unit 434 may be mixed with air produced by another component (e.g., an air conditioner) and blown through air ducts by the air mover. In other embodiments, evaporation unit 434 may perform both cooling and dehumidifying and thus may be used without a conventional air conditioner. As illustrated, a first output airflow 438 may be discharged from the evaporation unit 434, and a second output airflow 440 may be discharged from the condensing unit 436. First output airflow 438 may be at a temperature approximately the same as the first airflow 400 introduced into the energy recovery ventilation unit 100.

Figure 5:
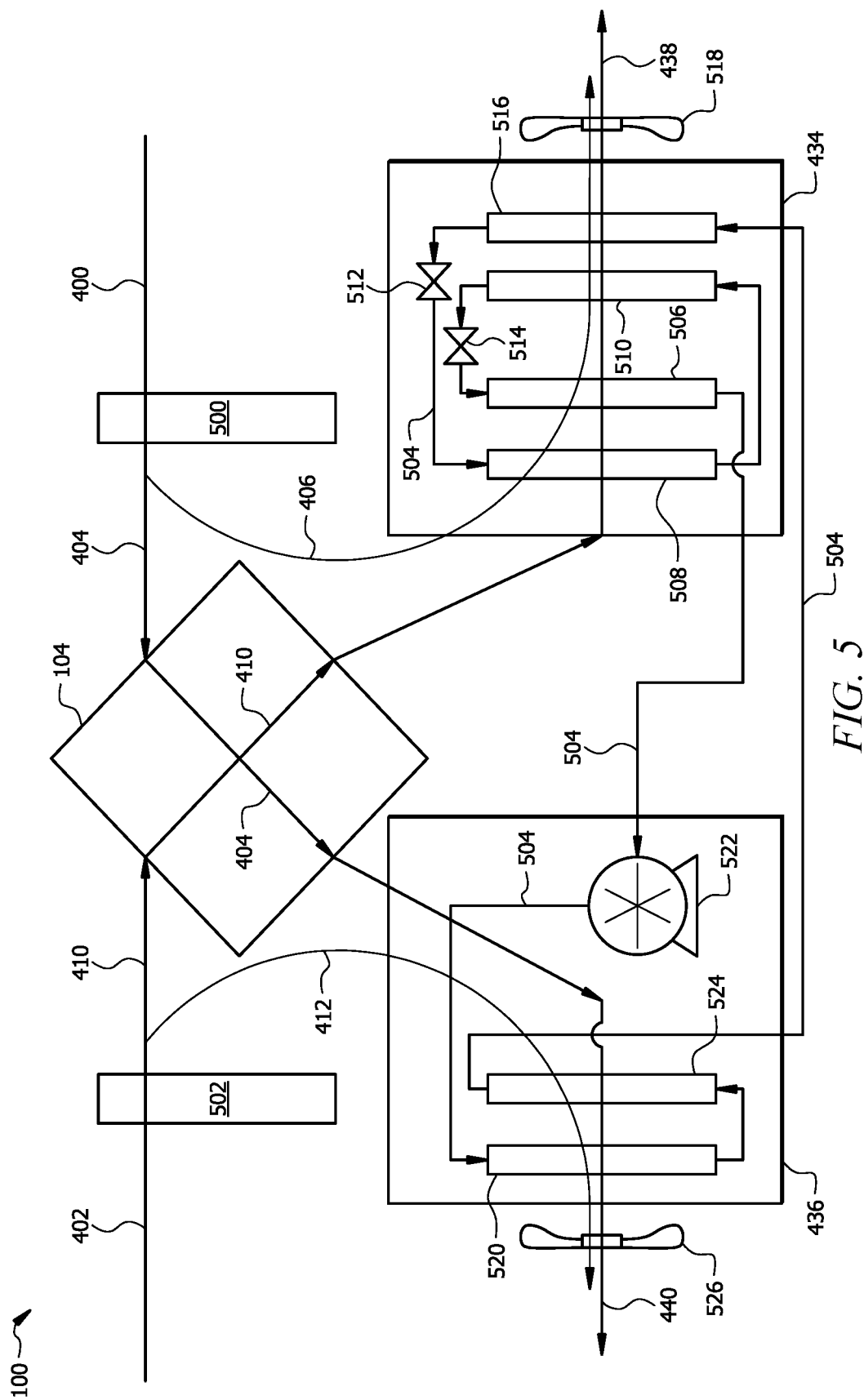
FIG. 5 illustrates a block diagram of the example energy recovery ventilation unit of FIG. 1, according to certain embodiments.

FIG. 5 illustrates a block diagram of the example energy recovery ventilation unit 100 of FIG. 1 in a ventilation and dehumidification mode, according to certain embodiments. In the ventilation and dehumidification mode, the energy recovery ventilation unit 100 may utilize the split airflows of the first airflow 400 and second airflow 402 to remove a portion of air within the structure fluidly coupled to the energy recovery ventilation unit 100 and replace that portion of air with air supplied from an external environment. In these embodiments, the level of moisture content in the air within the structure may be regulated to be maintained at a constant value through operation of the dehumidification system 106 (referring to FIG. 1).

During the ventilation and dehumidification mode, the first airflow 400 and second airflow 402 may be introduced into the energy recovery ventilation unit 100. Each of the first and second airflows 400, 402 may flow through a first filter 500 and a second filter 502, respectively, for the removal of particulates or pollutants present in each of the first and second airflows 400, 402. The first portion 404 of the first airflow 400 and the first portion 410 of the second airflow 402 may then be introduced into the ERV core 104. Concurrently, the second portion 406 of the first airflow 400 and the second portion 412 of the second airflow 402 may be introduced into the first lower section 408 (referring to FIG. 4) and the second lower section 414 (referring to FIG. 4), respectively. While flowing through the ERV core 104, heat and mass transfer may occur between the first portion 404 of the first airflow 400 and the first portion 410 of the second airflow 402. The first portion 404 of the first airflow 400 may then be discharged into the second lower section 414 and combine with the second portion 412 of the second airflow 402 prior to interacting with condensing unit 436 of the dehumidification system 106. The first portion 410 of the second airflow 402 may then be discharged into the first lower section 408 and combine with the second portion 406 of the first airflow 400 prior to interacting with evaporation unit 434 of the dehumidification system 106.

In general, evaporation unit 434 receives an inlet airflow (the combined first portion 410 of second airflow 402 and second portion 406 of first airflow 400), removes water from that inlet airflow, and discharges dehumidified air into a conditioned space (into the structure). Water is removed from the inlet air using a refrigeration cycle of a flow of refrigerant 504. The split configuration of dehumidification system 106, which includes evaporation unit 434 and condensing unit 436, allows heat from the cooling and dehumidification process to be rejected outdoors or to an unconditioned space (e.g., external to a space being dehumidified). This allows dehumidification system 106 to have a similar footprint to that of typical central air conditioning systems or heat pumps. Accordingly, dehumidification system 106 may perform functions of both a dehumidifier (dehumidifying air) and a central air conditioner (cooling air).

As illustrated in FIG. 5, evaporation unit 434 includes a primary evaporator 506, a secondary evaporator 508, a secondary condenser 510, a primary metering device 512, a secondary metering device 514, an optional sub-cooling coil 516, and a first fan 518, while condensing unit 436 includes an optional desuperheater 520, a compressor 522, a primary condenser 524, and a second fan 526. In an embodiment, the compressor 522 may be disposed within the evaporation unit 434 rather than disposed within the condensing unit 436.

With reference to FIG. 5, a flow of refrigerant 504 is circulated through dehumidification system 106 as illustrated. By including secondary evaporator 508 and secondary condenser 510, dehumidification system 106 causes at least part of the flow of refrigerant 504 to evaporate and condense twice in a single refrigeration cycle. This increases refrigerating capacity over typical systems without requiring any additional power to the compressor, thereby increasing the overall efficiency of the system.

In general, dehumidification system 106 attempts to match the saturating temperature of secondary evaporator 508 to the saturating temperature of secondary condenser 510. As the saturating temperature of secondary evaporator 508 is lower than the combined first portion 410 of second airflow 402 and second portion 406 of first airflow 400 introduced through the evaporation unit 434, evaporation happens in secondary evaporator 508. As the saturating temperature of secondary condenser 510 is higher than the first output airflow 438 after flowing through the primary evaporator 506, condensation happens in secondary condenser 510. The amount of refrigerant 504 evaporating in secondary evaporator 508 is substantially equal to that condensing in secondary condenser 510.

Primary evaporator 506 receives flow of refrigerant 504 from secondary metering device 514 and outputs flow of refrigerant 504 to compressor 522. Primary evaporator 506 may be any type of coil (e.g., fin tube, micro channel, etc.). Primary evaporator 506 receives the first output airflow 438 generated from secondary evaporator 508 and outputs first output airflow 438 to secondary condenser 510 at a lower temperature. To cool incoming first output airflow 438, primary evaporator 506 transfers heat from first output airflow 438 to flow of refrigerant 504, thereby causing flow of refrigerant 504 to evaporate at least partially from liquid to gas. This transfer of heat from first output airflow 438 to flow of refrigerant 504 also removes water from first output airflow 438.

Secondary condenser 510 receives flow of refrigerant 504 from secondary evaporator 508 and outputs flow of refrigerant 504 to secondary metering device 514. Secondary condenser 510 may be any type of coil (e.g., fin tube, micro channel, etc.). Secondary condenser 510 receives first output airflow 438 from primary evaporator 506 and outputs first output airflow 438 that is warmer and drier (i.e., the dew point will be the same but relative humidity will be lower) than the received first output airflow 438. Secondary condenser 510 generates a warmer and drier first output airflow 438 by transferring heat from flow of refrigerant 504 to the received first output airflow 438, thereby causing flow of refrigerant 504 to condense at least partially from gas to liquid. In embodiments, first output airflow 438 may be output into the conditioned space. In other embodiments, first output airflow 438 may first pass through and/or over sub-cooling coil 516 before being output into the conditioned space at a further decreased relative humidity.

As shown in FIG. 5, refrigerant 504 then flows to compressor 522 of condensing unit 436. Alternatively, the refrigerant 504 may continue to flow to the compressor 522 within the evaporation unit 434 prior to condensing unit 436. Compressor 522 pressurizes flow of refrigerant 504, thereby increasing the temperature of refrigerant 504. For example, if flow of refrigerant 504 entering compressor 522 is 128 psig/52° F./100% vapor, flow of refrigerant 504 may be 340 psig/150° F./100% vapor as it leaves compressor 522. Compressor 522 receives flow of refrigerant 504 from primary evaporator 506 and supplies the pressurized flow of refrigerant 504 to primary condenser 524.

Primary condenser 524 receives flow of refrigerant 504 from compressor 522 and outputs flow of refrigerant 504 back to evaporation unit 434. Primary condenser 524 may be any type of coil (e.g., fin tube, micro channel, etc.). Primary condenser 524 receives the combined first portion 404 of first airflow 400 and second portion 412 of second airflow 402 and outputs second output airflow 440. Second output airflow 440 may be, in general, warmer (i.e., has a lower relative humidity) than first output airflow 438. Primary condenser 524 transfers heat from flow of refrigerant 504, thereby causing flow of refrigerant 504 to condense at least partially from gas to liquid. In some embodiments, primary condenser 524 completely condenses flow of refrigerant 504 to a liquid (i.e., 100% liquid). In other embodiments, primary condenser 524 partially condenses flow of refrigerant 504 to a liquid (i.e., less than 100% liquid). In embodiments, the primary condenser 524 may receive the flow of refrigerant from optional desuperheater 520 disposed between the primary condenser 524 and the compressor 522.

Sub-cooling coil 516, which is an optional component of dehumidification 106 600, sub-cools the liquid refrigerant 504 as it leaves primary condenser 524. This, in turn, supplies primary metering device 512 with a liquid refrigerant that is 30 degrees (or more) cooler than before it enters sub-cooling coil 516. For example, if flow of refrigerant 504 entering sub-cooling coil 516 is 340 psig/105° F./60% vapor, flow of refrigerant 504 may be 340 psig/80° F./0% vapor as it leaves sub-cooling coil 516. The sub-cooled refrigerant 504 has a greater heat enthalpy factor as well as a greater density, which improves energy transfer between airflow and evaporator resulting in the removal of further latent heat from refrigerant 504. This further results in greater efficiency and less energy use of dehumidification system 106. Embodiments of dehumidification system 106 may or may not include a sub-cooling coil 516. In certain embodiments, sub-cooling coil 516 and primary evaporator 506 are combined into a single coil. Such a single coil includes appropriate circuiting for flow of air and refrigerant 504.

Secondary evaporator 508 receives flow of refrigerant 504 from primary metering device 512 and outputs flow of refrigerant 504 to secondary condenser 510. Secondary evaporator 508 may be any type of coil (e.g., fin tube, micro channel, etc.). Secondary evaporator 508 receives the combined first portion 410 of second airflow 402 and second portion 406 of first airflow 400 to generate the first output airflow 438 and outputs first output airflow 438 to primary evaporator 506. First output airflow 438, in general, is at a cooler temperature than the received combination of first portion 410 of second airflow 402 and second portion 406 of first airflow 400. To cool the incoming combination of first portion 410 of second airflow 402 and second portion 406 of first airflow 400, secondary evaporator 508 transfers heat from the combination of first portion 410 of second airflow 402 and second portion 406 of first airflow 400 to flow of refrigerant 504, thereby causing flow of refrigerant 504 to evaporate at least partially from liquid to gas.

In certain embodiments, the secondary evaporator 508, primary evaporator 506, and secondary condenser 510 are combined in a single coil pack. The single coil pack may include portions (e.g., separate refrigerant circuits) to accommodate the respective functions of secondary evaporator 508, primary evaporator 506, and secondary condenser 506, described above. In embodiments, the primary evaporator 506 is located between the secondary evaporator 508 and secondary condenser 506 of the single coil pack. In general, single coil pack can include the same or a different coil type compared to that of primary evaporator 506. For example, single coil pack may include a microchannel coil type, while primary evaporator 506 may include a fin tube coil type. This may provide further flexibility for optimizing a dehumidification system in which single coil pack and primary evaporator 506 are used.

In certain embodiments, one or both of the secondary evaporator 508 and primary evaporator 506 are subdivided into two or more circuits. In such embodiments, each circuit of the subdivided evaporator(s) is fed refrigerant by a corresponding metering device. The metering devices may include passive metering devices, active metering devices, or combinations thereof. For example, metering device 512 may be an active thermostatic expansion valve (TXV) and secondary metering device 514 may be a passive fixed orifice device (or vice versa). The metering devices may be configured to feed refrigerant to each circuit within the evaporators at a desired mass flow rate. Metering devices for feeding refrigerant to each circuit of the subdivided evaporator(s) may be used in combination with metering devices 512, 514 or may replace one or both of metering devices 512, 514.

Fan 518 may include any suitable components operable to draw the combination of first portion 410 of second airflow 402 and second portion 406 of first airflow 400 into evaporation unit 434 and through secondary evaporator 508, primary evaporator 506, and secondary condenser 510. Fan 518 may be any type of air mover (e.g., axial fan, forward inclined impeller, and backward inclined impeller, etc.). For example, fan 518 may be a backward inclined impeller positioned adjacent to secondary condenser 510.

While fan 518 is depicted as being located adjacent to condenser 510, it should be understood that fan 518 may be located anywhere along the airflow path of evaporation unit 434. Similarly, while fan 526 of condensing unit 436 is depicted in as being located in proximity to primary condenser 524, it should be understood that fan 526 may be located anywhere (e.g., above, below, beside) with respect to condenser 524, so long as fan 526 is appropriately positioned and configured to facilitate flow of the combination of first portion 404 of first airflow 400 and second portion 412 of second airflow 402 towards primary condenser 524.

The rate of airflow generated by fan 518 may be different than that generated by fan 526. For example, the flow rate of an airflow generated by fan 526 may be higher than the flow rate of an airflow generated by fan 518. This difference in flow rates may provide several advantages for the dehumidification systems described herein. For example, a large airflow generated by fan 526 may provide for improved heat transfer at the primary condenser 524 of the condensing unit 436.

Primary metering device 512 and secondary metering device 514 are any appropriate type of metering/expansion device. In some embodiments, primary metering device 512 is an electronic expansion valve (EEV) or thermostatic expansion valve (TXV) and secondary metering device 514 is a fixed orifice device (or vice versa). In certain embodiments, metering devices 512 and 514 remove pressure from flow of refrigerant 504 to allow expansion or change of state from a liquid to a vapor in evaporators 506 and 508. The high-pressure liquid (or mostly liquid) refrigerant entering metering devices 512 and 514 is at a higher temperature than the liquid refrigerant 504 leaving metering devices 512 and 514. For example, if flow of refrigerant 504 entering primary metering device 512 is 340 psig/80° F./0% vapor, flow of refrigerant 504 may be 196 psig/68° F./5% vapor as it leaves primary metering device 512. As another example, if flow of refrigerant 504 entering secondary metering device 514 is 196 psig/68° F./4% vapor, flow of refrigerant 504 may be 128 psig/44° F./14% vapor as it leaves secondary metering device 514.

In certain embodiments, secondary metering device 514 is operated in a substantially open state (referred to herein as a "fully open" state) such that the pressure of refrigerant 504 entering metering device 514 is substantially the same as the pressure of refrigerant 504 exiting metering device 504. For example, the pressure of refrigerant 504 may be 80%, 90%, 95%, 99%, or up to 100% of the pressure of refrigerant 504 entering metering device 514. With the secondary metering device 514 operated in a "fully open" state, primary metering device 512 is the primary source of pressure drop in dehumidification system 106. In this configuration, first output airflow 438 is not substantially heated when it passes through secondary condenser 510, and the secondary evaporator 508, primary evaporator 506, and secondary condenser 510 effectively act as a single evaporator. Although, less water may be removed from the initially received air when the secondary metering device 514 is operated in a "fully open" state, first output airflow 438 will be output to the conditioned space at a lower temperature than when secondary metering device 514 is not in a "fully open" state. This configuration corresponds to a relatively high sensible heat ratio (SHR) operating mode such that dehumidification system 106 may produce a cooler first output airflow 438 with properties similar to those of an airflow produced by a central air conditioner. If the rate of the incoming combination of first portion 410 of second airflow 402 and second portion 406 of first airflow 400 is increased to a threshold value (e.g., by increasing the speed of fan 518 or one or more other fans of dehumidification system 600), dehumidification system 106 may perform sensible cooling without removing water from that airflow.

Refrigerant 504 may be any suitable refrigerant such as R410a. In general, dehumidification system 106 utilizes a closed refrigeration loop of refrigerant 504 that passes from compressor 522 (optionally) through desuperheater 520, through primary condenser 524, (optionally) sub-cooling coil 516, primary metering device 512, secondary evaporator 508, secondary condenser 510, secondary metering device 514, and primary evaporator 506. Compressor 522 pressurizes flow of refrigerant 504, thereby increasing the temperature of refrigerant 504. Primary and secondary condensers 524 and 510, which may include any suitable heat exchangers, cool the pressurized flow of refrigerant 504 by facilitating heat transfer from the flow of refrigerant 504 to the respective airflows passing through them (i.e., the combination of first portion 404 of first airflow 400 and second portion 412 of second airflow 402 and first output airflow 438). The cooled flow of refrigerant 504 leaving primary and secondary condensers 524 and 510 may enter a respective expansion device (i.e., primary metering device 512 and secondary metering device 514) that is operable to reduce the pressure of flow of refrigerant 504, thereby reducing the temperature of flow of refrigerant 504. Primary and secondary evaporators 506 and 508, which may include any suitable heat exchanger, receive flow of refrigerant 504 from secondary metering device 514 and primary metering device 512, respectively. Primary and secondary evaporators 506 and 508 facilitate the transfer of heat from the respective airflows passing through them (i.e., first output airflow 438 and the combination of first portion 410 of second airflow 402 and second portion 406 of first airflow 400) to flow of refrigerant 504. Flow of refrigerant 504, after leaving primary evaporator 506, passes back to compressor 522, and the cycle is repeated.

In certain embodiments, the above-described refrigeration loop may be configured such that evaporators 506 and 508 operate in a flooded state. In other words, flow of refrigerant 504 may enter evaporators 506 and 508 in a liquid state, and a portion of flow of refrigerant 504 may still be in a liquid state as it exits evaporators 506 and 508. Accordingly, the phase change of flow of refrigerant 504 (liquid to vapor as heat is transferred to flow of refrigerant 504) occurs across evaporators 506 and 508, resulting in nearly constant pressure and temperature across the entire evaporators 506 and 508 (and, as a result, increased cooling capacity).

In operation of example embodiments of dehumidification system 106, the incoming combination of first portion 410 of second airflow 402 and second portion 406 of first airflow 400 may be drawn into evaporation unit 434 by fan 518. The incoming combination of airflows passes though secondary evaporator 508 in which heat is transferred from the air to the cool flow of refrigerant 504 passing through secondary evaporator 508. As a result, the combination of first portion 410 of second airflow 402 and second portion 406 of first airflow 400 may be cooled. As an example, if the air is 80° F./60% humidity, secondary evaporator 508 may output first output airflow 438 at 70° F./84% humidity. This may cause flow of refrigerant 504 to partially vaporize within secondary evaporator 508. For example, if flow of refrigerant 504 entering secondary evaporator 508 is 196 psig/68° F./5% vapor, flow of refrigerant 504 may be 196 psig/68° F./38% vapor as it leaves secondary evaporator 508.

The cooled air leaves secondary evaporator 508 as first output airflow 438 and enters primary evaporator 506. Like secondary evaporator 508, primary evaporator 506 transfers heat from first output airflow 438 to the cool flow of refrigerant 504 passing through primary evaporator 506. As a result, first output airflow 438 may be cooled to or below its dew point temperature, causing moisture in first output airflow 438 to condense (thereby reducing the absolute humidity of first output airflow 438). As an example, if first output airflow 438 is 70° F./84% humidity, primary evaporator 506 may output first output airflow 438 at 54° F./98% humidity. This may cause flow of refrigerant 504 to partially or completely vaporize within primary evaporator 506. For example, if flow of refrigerant 504 entering primary evaporator 506 is 128 psig/44° F./14% vapor, flow of refrigerant 504 may be 128 psig/52° F./100% vapor as it leaves primary evaporator 506. In certain embodiments, the liquid condensate from first output airflow 438 may be collected in a drain pan connected to a condensate reservoir. Additionally, the condensate reservoir may include a condensate pump that moves collected condensate, either continually or at periodic intervals, out of dehumidification system 106 (e.g., via a drain hose) to a suitable drainage or storage location.

The first output airflow 438 leaves primary evaporator 506 at a lower temperature and enters secondary condenser 510. Secondary condenser 510 facilitates heat transfer from the hot flow of refrigerant 504 passing through the secondary condenser 510 to first output airflow 438. This reheats first output airflow 438, thereby decreasing the relative humidity of first output airflow 438. As an example, if first output airflow 438 is 54° F./98% humidity, secondary condenser 510 may output first output airflow 438 at 65° F./68% humidity. This may cause flow of refrigerant 504 to partially or completely condense within secondary condenser 510. For example, if flow of refrigerant 504 entering secondary condenser 510 is 196 psig/68° F./38% vapor, flow of refrigerant 504 may be 196 psig/68° F./4% vapor as it leaves secondary condenser 510. In some embodiments, first output airflow 438 leaves secondary condenser 510 and is output to a conditioned space.

Primary condenser 524 facilitates heat transfer from the hot flow of refrigerant 504 passing through the primary condenser 524 to the combination of first portion 404 of first airflow 400 and second portion 412 of second airflow 402. This heats the surrounding air, which is output to an unconditioned space (e.g., outdoors) as second output airflow 440. As an example, if the combination of first portion 404 of first airflow 400 and second portion 412 of second airflow 402 is 65° F./68% humidity, primary condenser 524 may output second output airflow 440 at 102° F./19% humidity. This may cause flow of refrigerant 504 to partially or completely condense within primary condenser 524. For example, if flow of refrigerant 504 entering primary condenser 524 is 340 psig/150° F./100% vapor, flow of refrigerant 504 may be 340 psig/105° F./60% vapor as it leaves primary condenser 524.

As described above, some embodiments of dehumidification system 106 may include a desuperheater 520 in the airflow between an outlet of the condensing unit 436 and primary condenser 524. Desuperheater 520 facilitates heat transfer from the flow of refrigerant 504 passing through to ambient airflows. This may cause flow of refrigerant 504 to partially or completely condense within desuperheater 520.

Although a particular implementation of the dehumidification system 106 is illustrated and primarily described, the present disclosure contemplates any suitable implementation of the dehumidification system 106, according to particular needs. Moreover, although various components of the dehumidification system 106 have been depicted as being located at particular positions, the present disclosure contemplates those components being positioned at any suitable location, according to particular needs.

Figure 6:
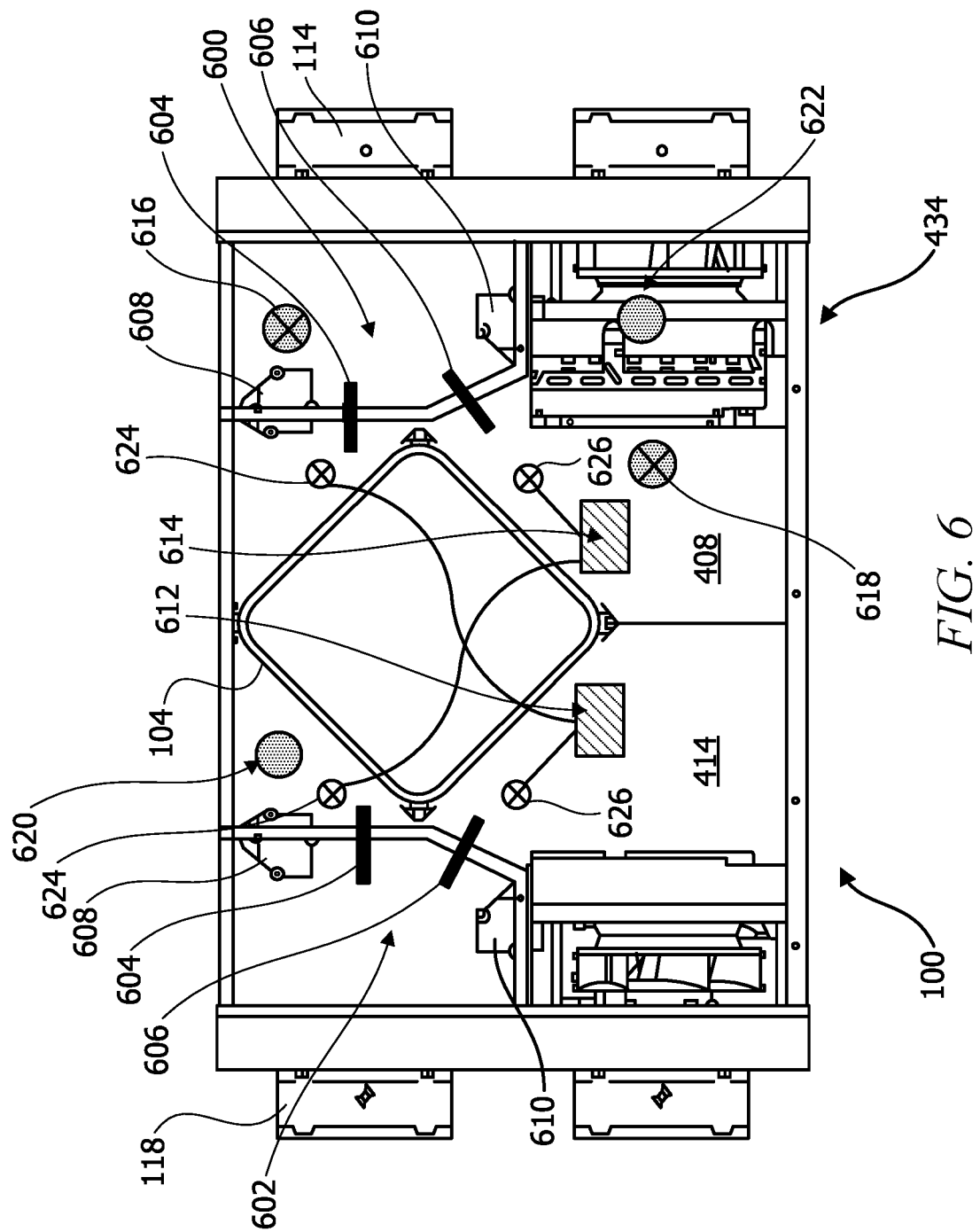
FIG. 6 illustrates another cross-section of the example energy recovery ventilation unit of FIG. 1, according to certain embodiments.

FIG. 6 illustrates a cross-section of the example energy recovery ventilation unit 100 of FIG. 1, according to certain embodiments. As illustrated, the energy recovery ventilation unit 100 may comprise a first set of dampers 600 and a second set of dampers 602. The first and second sets of dampers 600, 602 may direct airflows to the ERV core 104, bypass the ERV core 104 and flow towards either the first lower section 408 or second lower section 414, or a combination thereof. The first set of dampers 600 may be disposed between the ERV core 104 and the first panel inlet 114, and the second set of dampers 602 may be disposed between the ERV core 104 and the second panel inlet 118.

Each of the first set of dampers 600 and the second set of dampers 602 may comprise a core damper 604 and a bypass damper 606. The core damper 604 of each of the first and second sets of dampers 600, 602 may be operable to introduce an airflow into the ERV core 104 or to inhibit an airflow from being introduced into the ERV core 104, depending on a mode of operation of the energy recovery ventilation unit 100. The bypass damper 606 of the first set of dampers 600 may introduce or inhibit a portion of the first airflow 400 (referring to FIG. 4) from flowing into the first lower section 408 of the energy recovery ventilation unit 100. The bypass damper 606 of the second set of dampers 602 may introduce or inhibit a portion of the second airflow 402 (referring to FIG. 4) from flowing into the second lower section 414 of the energy recovery ventilation unit 100. As illustrated, each core damper 604 may be operably coupled to a core motor 608, and each bypass damper 606 may be operably coupled to a bypass motor 610. Each core motor 608 may operate to actuate its respective core damper 604, and each bypass motor 610 may operate to actuate its respective bypass damper 606. In embodiments, any suitable motor may be used as the core and bypass motors 608, 610. Further, each core motor 608 and bypass motor 610 may be communicatively coupled to the controller 200 (referring to FIG. 3), wherein the controller 200 may transmit instructions to each core motor 608 and bypass motor 610 to actuate a respective core damper 604 and bypass damper 606 for a mode of operation.

In embodiments, both the first set of dampers 600 and the second set of dampers 602 may be continuously adjusted during different modes of operation to maintain a set airflow across the ERV core 104 and provide additional airflow across the dehumidification system 106 (referring to FIG. 1) via a bypass. The fans 518, 526 (referring to FIG. 5) may be turned on to set speeds, wherein airflow proportioning for first airflow 400 (referring to FIG. 4) and second airflow 402 (referring to FIG. 4) may be adjusted to maintain the proper amount of airflow across the ERV core 104 with the first set of dampers 600 and the second set of dampers 602. The airflow (for example, first airflow 400 and second airflow 402) across the ERV core 104 may be set by a user as the ventilation rate. The airflow may be determined by the pressure differential across the ERV core 104 utilizing pressure differential sensors. The first set of dampers 600 and the second set of dampers 602 may be actuated to constantly adjust to react to changes in operational pressure.

The energy recovery ventilation unit 100 may further comprise a plurality of sensors communicatively coupled to the controller 200, wherein a mode of operation may be determined and initiated based on one or more measurements provided by a sensor. As illustrated, the energy recovery ventilation unit 100 may comprise a first pressure differential sensor 612, a second pressure differential sensor 614, a first airflow sensor 616, a first lower section sensor 618, a core temperature sensor 620, and an evaporator temperature sensor 622. The first pressure differential sensor 612 may be disposed within the second lower section 414, and the second pressure differential sensor 614 may be disposed within the first lower section 408. Each of the first and second pressure differential sensors 612, 614 may comprise a first probe 624 and a second probe 626. The first probe 624 of the first pressure differential sensor 612 may be disposed between the core damper 604 of the second set of dampers 602 and the ERV core 104, and the second probe 626 of the first pressure differential sensor 612 may be disposed downstream of the ERV core 104 within the second lower section 414. The first probe 624 of the second pressure differential sensor 614 may be disposed between the core damper 604 of the first set of dampers 600 and the ERV core 104, and the second probe 626 of the second pressure differential sensor 614 may be disposed downstream of the ERV core 104 within the first lower section 408. Each first and second probes 624, 626 may be communicatively coupled to their respective first and second pressure differential sensors 612, 614. In embodiments, the first and second pressure differential sensors 612, 614 may measure a pressure across the ERV core 104 by taking a pressure measurement upstream and downstream of the ERV core 104, via the first and second probes 624, 626, to determine an airflow rate.

The first airflow sensor 616 and the first lower section sensor 618 may both be sensors operable to determine a temperature measurement and a relative humidity measurement of an airflow at a location. The first airflow sensor 616 may be disposed between the first panel inlet 114 and the first set of dampers 600, and the first lower section sensor 618 may be disposed downstream of the ERV core 104 within the first lower section 408. During operations, the first airflow sensor 616 may determine a temperature measurement and/or a relative humidity measurement of the first airflow 400 (referring to FIG. 4) as the first airflow is introduced into the energy recovery ventilation unit 100. Similarly, the first lower section sensor 618 may determine a temperature measurement and/or a relative humidity measurement of the air introduced into the first lower section 408 prior to the air flowing into the evaporation unit 414. The temperature measurement and/or a relative humidity measurements may be used to determine when the dehumidification system 106 (referring to FIG. 1) should be activated based on a user setpoint, wherein the user setpoint may be associated with the relative humidity inside the structure, the dew point of the ventilated air being introduced into the structure, or both.

The core temperature sensor 620 and the evaporator temperature sensor 622 may both be sensors operable to determine a temperature measurement at a location. The core temperature sensor 620 may be disposed between the core damper 604 of the second set of dampers 602 and the ERV core 104, and the evaporator temperature sensor 622 may be disposed within the evaporation unit 434 proximate to the secondary evaporator 508 (referring to FIG. 5) or primary evaporator 506 (referring to FIG. 5). The core temperature sensor 620 may determine a temperature measurement of the ERV core 104, and the evaporator temperature sensor 622 may determine a temperature measurement of the secondary evaporator 508 or primary evaporator 506. During operations, the core temperature sensor 620 and the evaporator temperature sensor 622 may initiate a defrost mode to defrost the ERV core 104 and/or the evaporation unit 434.

Figure 7A:
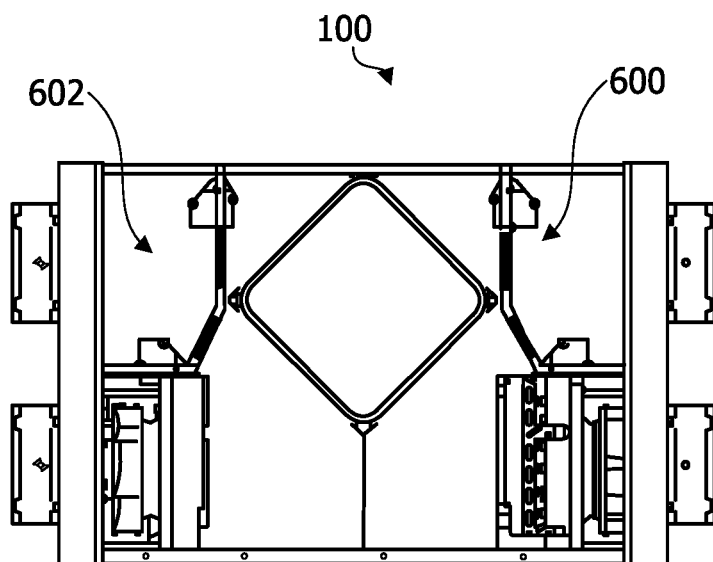
FIGS. 7A, 7B, 7C, 7D, 7E, and 7F illustrate example operations of the energy recovery ventilation unit of FIG. 1, according to certain embodiments.

FIGS. 7A-7F illustrate example operations of the energy recovery ventilation unit 100 of FIG. 1, according to certain embodiments. In embodiments, the controller 200 (referring to FIG. 3) may transmit instructions to transition between different modes of operation. FIG. 7A illustrates the energy recovery ventilation unit 100 in a first mode of operation. During the first mode of operation, both the first set of dampers 600 and the second set of dampers 602 may be in a first position configured to inhibit the flow of an airflow. For example, the first set of dampers 600 may inhibit the first airflow 400 (referring to FIG. 4) from being introduced into the ERV core 104 (referring to FIG. 1), and the second set of dampers 602 may inhibit the second airflow 402 (referring to FIG. 4 from being introduced into the ERV core 104. With reference to the present disclosure, this may be the default mode of operation for the energy recovery ventilation unit 100 and may be termed as a "standby" mode. FIGS. 7B-7F illustrate the energy recovery ventilation unit 100 in various second modes of operation. During any one of the various second modes of operation, at least one of the first set of dampers 600 and the second set of dampers 602 is actuated to a second position wherein at least one of the first airflow 400 and the second airflow 402 flows to any one of the ERV core 104, the evaporation unit 434, and the condensing unit 436.

Figure 7B:
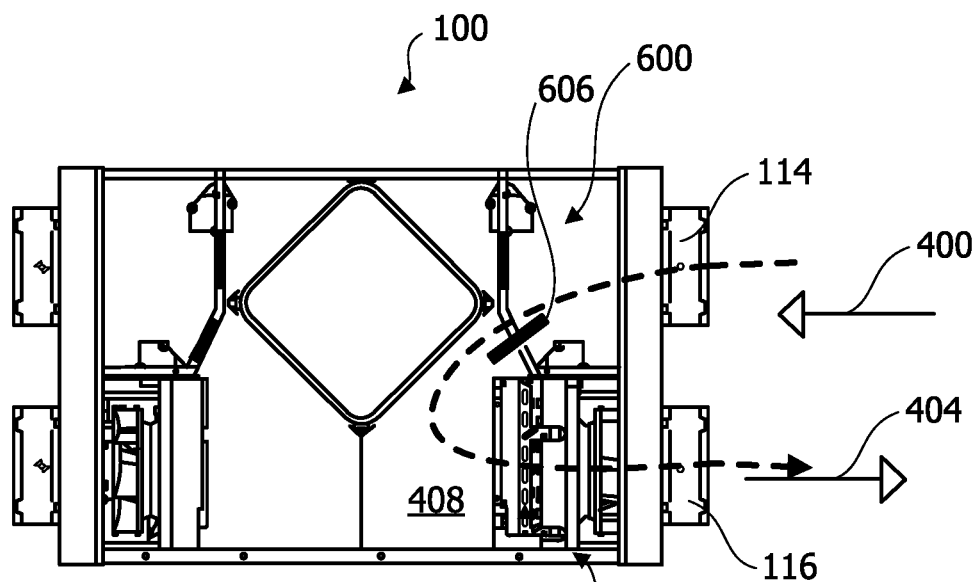

FIG. 7B illustrates the energy recovery ventilation unit 100 in an example second mode of operation. The present second mode of operation may be termed as a "filter" mode. During this second mode of operation, controller 200 may instruct the bypass damper 606 of the first set of dampers 600 to rotate to a second position. In this second position, the first airflow 400 may be introduced through the first panel inlet 114 to flow into the first lower section 408. The first airflow 400 may then pass through the evaporation unit 434 and exit through the first panel outlet 116. In the filter mode, the evaporation unit 434 is not operating, and the first airflow 400 is not conditioned as it flows through the energy ventilation unit 100. The first airflow 400 does flow through the first filter 500 (referring to FIG. 1), and particulates may be removed from the first airflow 400 as the first airflow 400 flows through the energy recovery ventilation unit 100. The first airflow 400 may be returned to inside the structure comprising fewer particulates after passing through the first filter 500.

Figure 7C:
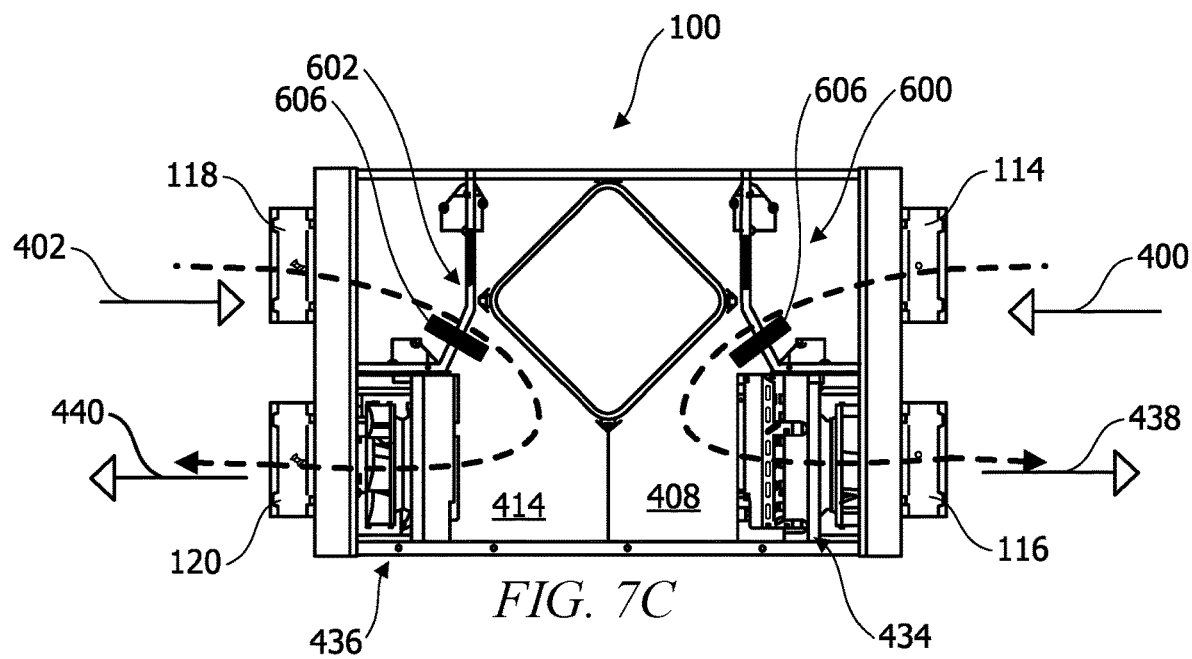

FIG. 7C illustrates the energy recovery ventilation unit 100 in an example second mode of operation. The present second mode of operation may be termed as a "dehumidification" mode. During this second mode of operation, controller 200 may instruct the bypass damper 606 of both the first set of dampers 600 and the second set of dampers 602 to rotate to a second position. The controller 200 may initiate the dehumidification mode based on receiving a measurement from the first airflow sensor 616 (referring to FIG. 6). In this second position, the first airflow 400 may be introduced through the first panel inlet 114 to flow into the first lower section 408, and the second airflow 402 may be introduced through the second panel inlet 118 to flow into the second lower section 414. The controller 200 may further instruct the dehumidification system 106 (referring to FIG. 1) to operate in order to reduce the relative humidity of the first airflow 400. As illustrated, the first airflow 400 may then pass through the evaporation unit 434. In the dehumidification mode, the evaporation unit 434 is operating, and the first output airflow 438 is generated as the first airflow 400 flows through the evaporation unit 434. The first output airflow 438 then is discharged from the first panel outlet 116. Concurrently, the second airflow 402 may then pass through the condensing unit 436. In the dehumidification mode, the condensing unit 436 is operating, and the second output airflow 440 is generated as the second airflow 402 flows through the condensing unit 436. The second output airflow 440 then is discharged from the second panel outlet 120 to an unconditioned space.

Figure 7D:
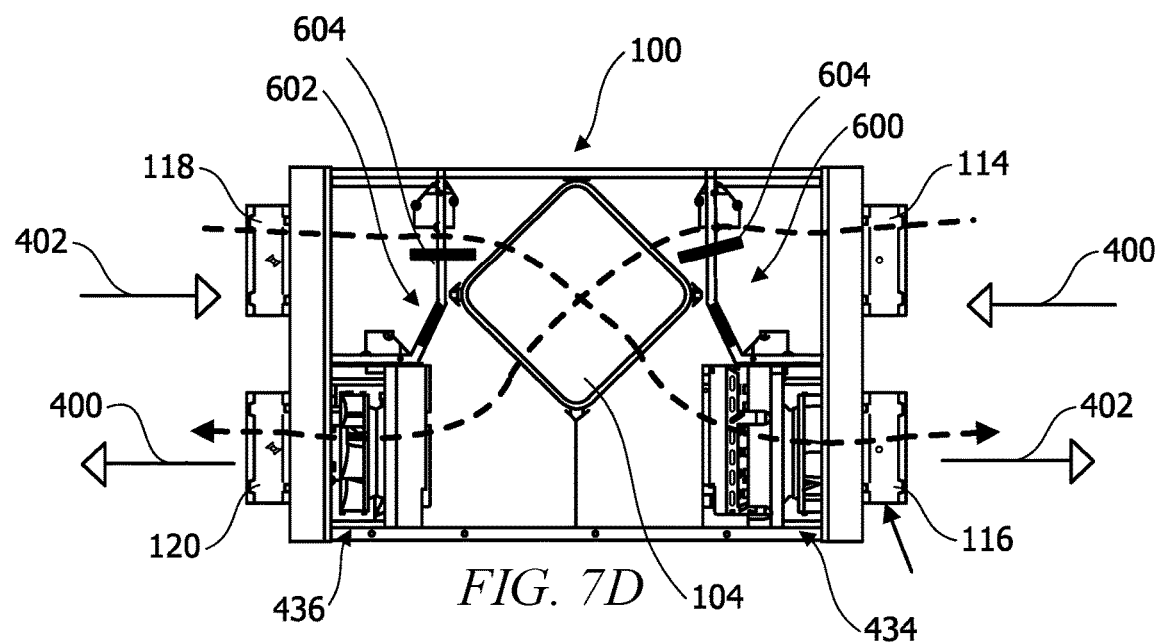

FIG. 7D illustrates the energy recovery ventilation unit 100 in an example second mode of operation. The present second mode of operation may be termed as a "ventilation" mode or "pollution" mode depending on a fan speed of fans 518, 526 (referring to FIG. 5). The controller 200 may initiate the ventilation mode based on a schedule set by a user. The fan speed of each of the fans 518, 526 may be controlled by the first and second pressure differential sensors 612, 614 (referring to FIG. 6) (for example, by measuring a pressure drop across the ERV core 104, which equates to a determined airflow). The fans 518, 526 may be operable to match the first and second airflows 400, 402 to an airflow set by the user. During ventilation mode, controller 200 may instruct the core damper 604 of both the first set of dampers 600 and the second set of dampers 602 to rotate to a second position. In this second position, the first airflow 400 may be introduced through the first panel inlet 114 to flow into the ERV core 104, and the second airflow 402 may be introduced through the second panel inlet 118 to flow into the ERV core 104. While within the ERV core 104, heat and mass transfer may occur between the first airflow 400 and second airflow 402. The ERV core 104 may discharge the second airflow 402 to flow towards the evaporation unit 434 and may discharge the first airflow 400 to flow towards the condensing unit 436. In the ventilation mode, both the evaporation unit 434 and the condensing unit 436 are not operating. As the evaporation unit 434 and the condensing unit 436 are not operating, the discharged second airflow 402 may flow through the evaporation unit 434 and out first panel outlet 116 to be directed back towards the structure. Further, the discharged first airflow 400 may flow through the condensing unit 436 and out second panel outlet 120 to be discharged to an unconditioned space. In embodiments, the ventilation mode may provide for replacing old, stale air present within a structure with fresh air from an external environment.

The energy ventilation unit 100 may operate in the pollution mode to discharge an airflow from within a structure that comprises pollutants. In embodiments, the energy ventilation unit 100 may increase the fan speed of fans 518, 526 compared to ventilation mode, wherein the fans 518, 526 may operate for a designated time period. Within this designated time period, the energy ventilation unit 100 may not transfer to another mode of operation. By operating in the pollution mode, the pollutants may be discharged from the structure and may not be reintroduced through the bypass dampers 606 (referring to FIG. 6).

In further embodiments, the energy recovery ventilation unit 100 may operate in a second mode of operation that is a combination of the ventilation and dehumidification modes (as best illustrated in FIG. 5). For the combination ventilation and dehumidification modes, controller 200 may instruct both the core damper 604 and bypass damper 606 of both the first set of dampers 600 and the second set of dampers 602 to rotate to a second position. At this second position, the first and second airflows 400, 402 may be apportioned into the first and second portions 404,406 and 410, 412, respectively. The controller 200 may further instruct the dehumidification system 106 (referring to FIG. 1) to operate in order to reduce the relative humidity of the air (for example, the combination of the first portion 410 of second airflow 402 and second portion 406 of first airflow 400) present in first lower section 408 (referring to FIG. 4). The first output airflow 438 may be generated as the combination of the first portion 410 of second airflow 402 and second portion 406 of first airflow 400 flows through the evaporation unit 434. The first output airflow 438 then is discharged from the first panel outlet 116 to flow towards the structure. Concurrently, a combination of first portion 404 of first airflow 400 and second portion 412 of second airflow 402 may pass through the condensing unit 436. In the current mode of operation, the condensing unit 436 is operating, and the second output airflow 440 is generated. The second output airflow 440 then is discharged from the second panel outlet 120 to an unconditioned space.

Figure 7E:
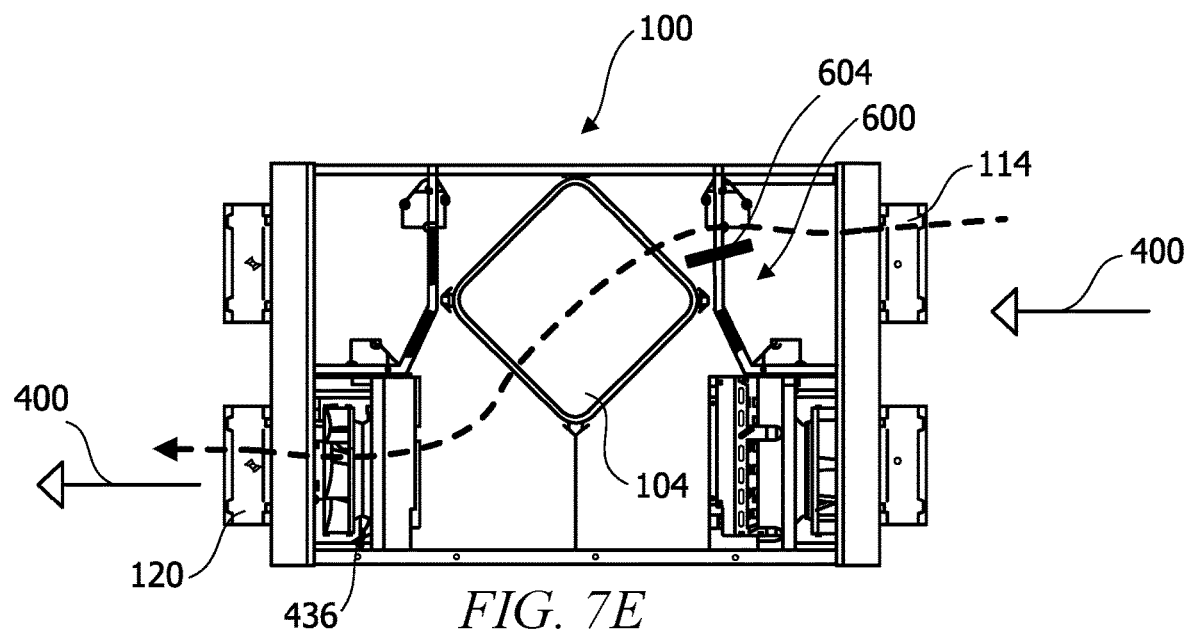

FIG. 7E illustrates the energy recovery ventilation unit 100 in an example second mode of operation. The present second mode of operation may be termed as an "exhaust" mode. During this second mode of operation, controller 200 may instruct the core damper 604 of the first set of dampers 600 to rotate to a second position based on a temperature measurement from core temperature sensor 620 (referring to FIG. 6). In this second position, the first airflow 400 may be introduced through the first panel inlet 114 to flow into the ERV core 104. The first airflow 400 may then pass through the condensing unit 436 and exit through the second panel outlet 120. In the exhaust mode, the condensing unit 436 is not operating, and the first airflow 400 is not conditioned as it flows through the energy ventilation unit 100. The exhaust mode may further be utilized to mitigate or reduce frost build-up present in the ERV core 104 by flowing the first airflow 400 through the ERV core 104. The energy ventilation unit 100 may further operate in a high exhaust mode, which may be a combination of the exhaust mode and the pollution mode, to discharge an airflow from within a structure that comprises pollutants. In certain embodiments, the controller 200 may initiate the high exhaust mode based on receiving a measurement from the core temperature sensor 620 and when a pollution switch connected to the terminal 204 (referring to FIG. 2) is activated. During the high exhaust mode, the core damper 604 of the first set of dampers 600 may be rotated to the second position, and the fan speed of fans 518, 526 may be increased to the pollution mode fan speed.

Figure 7F:
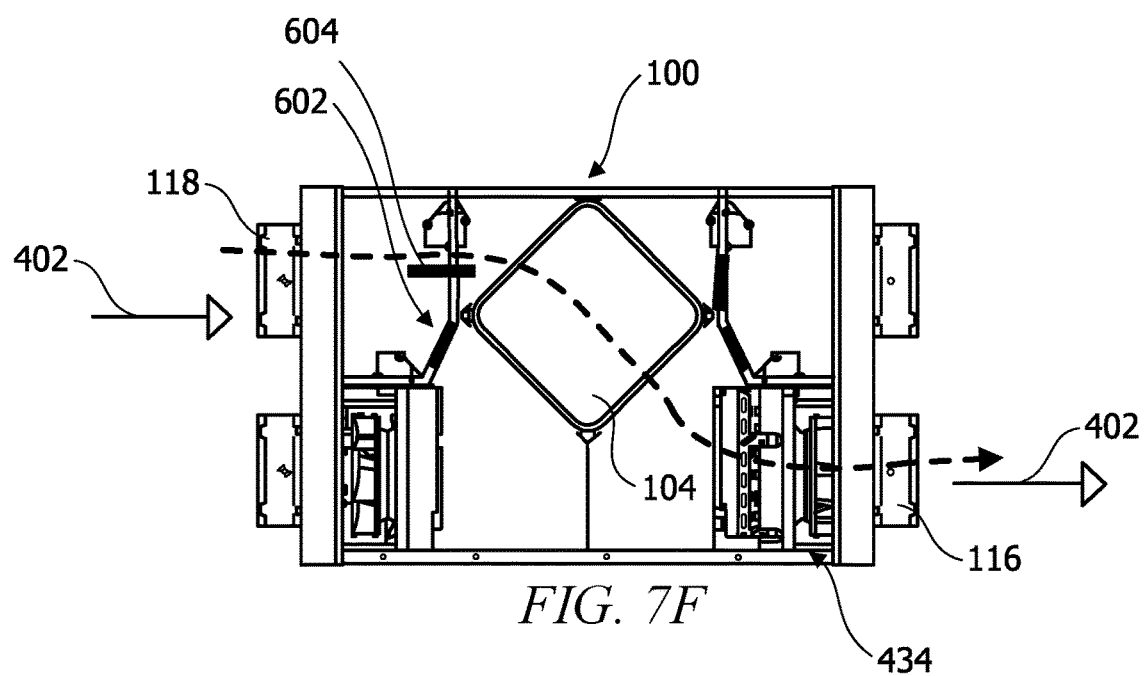

FIG. 7F illustrates the energy recovery ventilation unit 100 in an example second mode of operation. The present second mode of operation may be termed as an "make-up air" mode. During this second mode of operation, controller 200 may instruct the core damper 604 of the second set of dampers 602 to rotate to a second position. In this second position, the second airflow 402 may be introduced through the second panel inlet 118 to flow into the ERV core 104. The second airflow 402 may then pass through the evaporation unit 434 and exit through the first panel outlet 116. In the make-up mode, the evaporation unit 434 is not operating, and the second airflow 402 is not conditioned as it flows through the energy ventilation unit 100. The energy ventilation unit 100 may operate in the make-up air mode to provide additional air when the interior of a structure is de-pressurizing. In certain embodiments, the controller 200 may initiate the make-up air mode based on receiving an external measurement via the leads 202 (referring to FIG. 2) and terminal 204 (referring to FIG. 2). For example, a kitchen hood may be operating to remove air from inside the building. The make-up air mode may supply new air back into the building.

Figure 8:
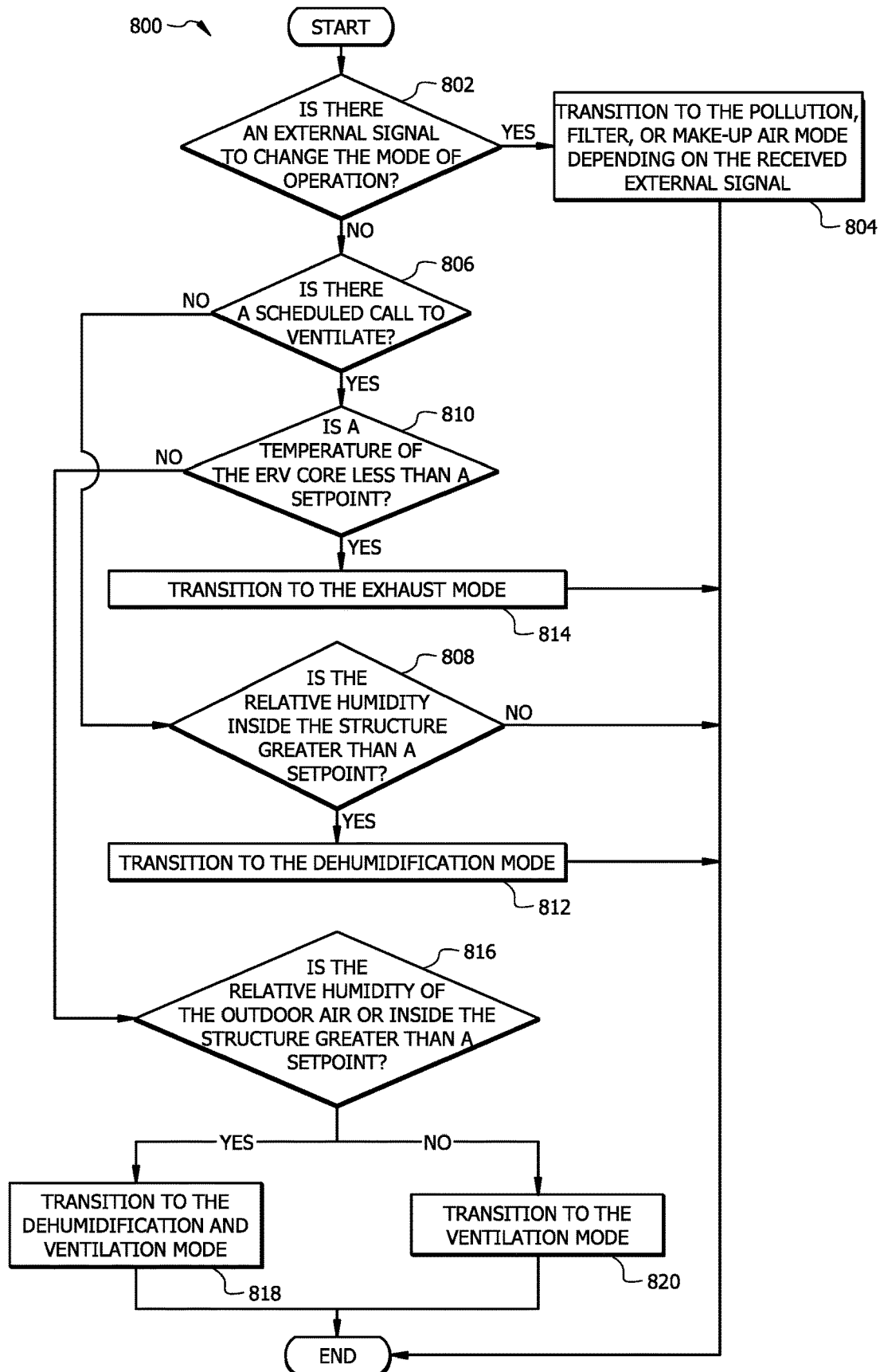
FIG. 8 illustrates a flow diagram of an example operation of the energy recovery ventilation unit of FIG. 1, according to certain embodiments.

FIG. 8 illustrates a flow diagram of an example operation of the energy recovery ventilation unit 100 of FIG. 1 for determining second modes of operation, according to certain embodiments. In embodiments, the energy recovery ventilation unit 100 may be operating in a first mode of operation (for example, the standby mode). An operation 800 may be implemented using the controller 200 of FIG. 3 to determine which second mode of operation to initiate. Operation 800 may begin at step 802 where the controller 200 may receive an external signal from an external component coupled to the leads 202 (referring to FIG. 2) connected to the terminal 204 (referring to FIG. 2) of the energy recovery ventilation unit 100. If there is a determination that controller 200 has received a signal from an external component, the operation 800 may proceed to step 804. Otherwise, the operation 800 proceeds to step 806.

At step 804, the controller 200 may determine which second mode of operation to which the received external signal is associated. For example, if an external signal is received from a sensor operably coupled to a kitchen hood, the controller 200 may determine that the kitchen hood is discharging air from inside the building and that the make-up air mode may be implemented to re-supply the building with air. In another example, if an external signal is received from a sensor that detects a concentration of pollutants present in the air, the controller 200 may implement the pollution mode to discharge the air present within the building and reduce the amount of pollutants in the building. In another example, the filter mode may be selected for implementation by a user in order to cycle the existing air through a filter, and the controller 200 may implement the filter mode upon receiving the signal indicating the user has selected the filter mode. Once the correct second mode of operation is determined, the controller 200 may instruct the energy recovery ventilation unit 100 to transition to that mode of operation.

At step 806, controller 200 may determine whether there is a scheduled call for the energy recovery ventilation unit 100 to ventilate. In embodiments, the ventilation mode may be set to occur at predetermined intervals in order to maintain optimal indoor air quality. For example, the ventilation mode may be determined to be implemented every fifteen minutes for an amount of time. If there is not a determination that there is a scheduled call for the ventilation mode, the operation 800 may proceed to step 808. Otherwise, the operation 800 proceeds to step 810.

At step 808, the controller 200 may determine whether the relative humidity inside the building is greater than a setpoint. For example, a user may determine the setpoint for the air inside to have a relative humidity of 60%. If there is a determination that the relative humidity inside the building is greater than a setpoint (i.e., greater than 60%), the operation 800 may proceed to step 812. Otherwise, the operation 800 proceeds to end.

At step 812, the controller 200 may instruct the energy recovery ventilation unit 100 to transition to the dehumidification mode in order to reduce the relative humidity of the air inside the building. The controller 200 may initiate the dehumidification mode based on receiving a measurement from the first airflow sensor 616 (referring to FIG. 6) or from the first lower section sensor 618 (referring to FIG. 6). During operations, the first and second airflows 400, 402 (referring to FIG. 4) may be introduced into the energy recovery ventilation unit 100. The controller 200 may instruct the dehumidification system 106 (referring to FIG. 1) to operate in order to reduce the relative humidity of the first airflow 400. The first output airflow 438 may be generated, wherein the first output airflow 438 is discharged back into the building at a lower relative humidity.

Referring back to step 810, the controller 200 may determine whether the temperature of the ERV core 104 (referring to FIG. 1) is less than a setpoint. For example, the setpoint for the temperature of the ERV core 104 may be predetermined to be 20° F. If there is a determination that the temperature of the ERV core 104 is less than the setpoint (i.e., less than 20° F.), the operation 800 may proceed to step 814. Otherwise, the operation 800 proceeds to step 816.

At step 814, the controller 200 may instruct the energy recovery ventilation unit 100 to transition to the exhaust mode in order to mitigate or reduce frost build-up present in the ERV core 104 by flowing the first airflow 400 through the ERV core 104. The controller 200 may initiate the exhaust mode based on receiving a measurement from the core temperature sensor 620 (referring to FIG. 6).

At step 816, the controller 200 may determine whether the relative humidity of the air outside the building or of the air inside the building is greater than a setpoint. Similar to step 808, a user may determine the setpoint for the air inside to have a relative humidity of 60%. The controller 200 may further be able to monitor dew point of the outside air to be introduced into the building (for example, the second airflow 402). If there is a determination that the relative humidity inside the building or of the outside air being introduced into the building is greater than a setpoint (i.e., greater than 60%), the operation 800 may proceed to step 818. Otherwise, the operation 800 proceeds to step 820. After either step 818 or step 820, the operation 800 proceeds to end.

At step 818, the controller 200 may instruct the energy recovery ventilation unit 100 to transition to the dehumidification and ventilation mode in order to reduce the relative humidity of the air inside the building and to ventilate the air within the building. During operations, the first and second airflows 400, 402 may be introduced into the energy recovery ventilation unit 100 and may be apportioned into the first and second portions 404, 406 (referring to FIG. 4) and 410, 412 (referring to FIG. 4), respectively. The controller 200 may instruct the dehumidification system 106 to operate in order to reduce the relative humidity of the air (for example, the combination of the first portion 410 of second airflow 402 and second portion 406 of first airflow 400) present in first lower section 408 (referring to FIG. 4) of the energy recovery ventilation unit 100. The first output airflow 438 may be generated, wherein the first output airflow 438 is discharged back into the building at a lower relative humidity. In this mode of operation, the first output airflow 438 may include portions of the first airflow 400 and second airflow 402. In the sole dehumidification mode, the first output airflow 438 may only include the first airflow 400. This difference provides new, fresh air (from second airflow 402) to be introduced into the building at a desired relative humidity. After step 818, the operation proceeds to end.

At step 820, the controller 200 may instruct the energy recovery ventilation unit 100 to transition to the ventilation mode in order to ventilate the air within the building. In embodiments, the ventilation mode may provide for replacing old, stale air present within a structure with fresh air from an external environment. The controller 200 may initiate the ventilation mode based on receiving a measurement from at least one of the first and second pressure differential sensors 612, 614 (referring to FIG. 6). During operations, the first and second airflows 400, 402 may be introduced into the energy recovery ventilation unit 100 and flow through the ERV core 104. While within the ERV core 104, heat and mass transfer may occur between the first airflow 400 and second airflow 402. The discharged second airflow 402 from ERV core 104 may be directed back into the building, and the discharged first airflow 400 may be discharged to an unconditioned space. After step 818, the operation proceeds to end.

Particular embodiments may repeat one or more steps of operation 800 of FIG. 8, where appropriate. Although this disclosure describes and illustrates particular steps of the operation of FIG. 8 as occurring in a particular order, this disclosure contemplates any suitable steps of the operation of FIG. 8 occurring in any suitable order. Furthermore, although this disclosure describes and illustrates particular components, devices, or systems carrying out particular steps of the operation of FIG. 8, this disclosure contemplates any suitable combination of any suitable components, devices, or systems carrying out any suitable steps of the operation of FIG. 8.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. An energy recovery ventilation unit comprising:
   a housing comprising a plurality of side panels;
   a first panel inlet and a first panel outlet, wherein each of the first panel inlet and the first panel outlet are disposed at one of the plurality of side panels, wherein the first panel inlet is configured to introduce a first airflow into the housing;
   a second panel inlet and a second panel outlet, wherein each of the second panel inlet and the second panel outlet are disposed at one of the plurality of side panels opposite to the first panel inlet and the first panel outlet, wherein the second panel inlet is configured to introduce a second airflow into the housing;
   a first set of dampers disposed downstream of the first panel inlet;
   a second set of dampers disposed downstream of the second panel inlet, wherein each of the first set of dampers and the second set of dampers comprises a core damper and a bypass damper;
   an energy recovery ventilation core disposed within the housing, wherein a partition extends from one of the plurality of side panels disposed at a bottom of the housing to the energy recovery ventilation core defining a first lower section and a second lower section of the housing, wherein the bypass damper of the first set of dampers provides fluid communication between the first panel inlet and the first lower section, and wherein the bypass damper of the second set of dampers provides fluid communication between the second panel inlet and the second lower section, the energy recovery ventilation core comprising:
   a first side comprising a first inlet operable to receive at least a portion of the first airflow, wherein the core damper of the first set of dampers is configured to allow a flow of the at least the portion of the first airflow from the first panel inlet to the first side;
   a second side comprising a second inlet operable to receive at least a portion of the second airflow, wherein the core damper of the second set of dampers is configured to allow a flow of the at least the portion of the second airflow from the second panel inlet to the second side;
   a third side comprising a first outlet operable to discharge the second airflow after heat transfers between the second airflow and the first airflow within the energy recovery ventilation core into the first lower section; and
   a fourth side comprising a second outlet operable to discharge the first airflow after heat transfers between the second airflow and the first airflow within the energy recovery ventilation core into the second lower section,
   wherein the energy recovery ventilation core is configured to facilitate both heat transfer and mass transfer between at least a portion of the first airflow and at least a portion of the second airflow:
   an evaporation unit disposed within the first lower section of the housing operable to generate a first output airflow;
   a condensing unit disposed within the second lower section of the housing operable to generate a second output airflow; and
   a controller communicatively coupled to both the first set of dampers and the second set of dampers, wherein during a ventilation and dehumidification mode of operation, the controller is configured to:
   actuate the first set of dampers to transition from a closed position to an open position, wherein the first airflow is partitioned into a first portion and a second portion; and
   actuate the second set of dampers to transition from the closed position to the open position, wherein the second airflow is partitioned into a first portion and a second portion;
   wherein the first portion of the first airflow flows through the first side of the energy recovery ventilation core, wherein the first portion of the second airflow flows through the second side of the energy recovery ventilation core, wherein the second portion of the first airflow flows into the first lower section, and wherein the second portion of the second airflow flows into the second lower section.

2. The energy recovery ventilation unit of claim 1, wherein the evaporation unit comprises:
   a secondary evaporator operable to:

receive at least one of the discharged second airflow and the first airflow; and transfer heat from the at least one of the discharged second airflow and the first airflow to a flow of refrigerant as the discharged second airflow or the first airflow passes through the secondary evaporator operable to generate the first output airflow;

a primary evaporator operable to:
receive the first output airflow from the secondary evaporator; and
transfer heat from the first output airflow to the flow of refrigerant as the first output airflow passes through the primary evaporator; and a secondary condenser operable to:
receive the flow of refrigerant from the secondary evaporator;
receive the first output airflow from the primary evaporator; and
transfer heat from the flow of refrigerant to the first output airflow as the first output airflow passes through the secondary condenser.

3. The energy recovery ventilation unit of claim 2, wherein the evaporation unit further comprises a sub-cooling coil operable to:
receive the flow of refrigerant from the primary condenser; and
transfer heat from the flow of refrigerant to the first output airflow as the first output airflow contacts the sub-cooling coil.

4. The energy recovery ventilation unit of claim 3, wherein two or more members selected from the group consisting of the secondary evaporator, the primary evaporator, the secondary condenser, and the sub-cooling coil are combined into a single coil pack.

5. The energy recovery ventilation unit of claim 1, further comprising a pressure differential sensor comprising a first probe and a second probe, wherein the first probe is disposed upstream of the energy recovery ventilation core and the second probe is disposed downstream of the energy recovery ventilation core, wherein at least one of the first set of dampers and the second set of dampers is configured to actuate in response to the pressure differential sensor determining a pressure across the energy recovery ventilation core.

6. The energy recovery ventilation unit of claim 1, further comprising a first fan disposed adjacent to the first panel outlet and operable to discharge the first output airflow from the housing.

7. The energy recovery ventilation unit of claim 6, further comprising a second fan disposed adjacent to the second panel outlet and operable to discharge the second output airflow from the housing.

8. The energy recovery ventilation unit of claim 1, further comprising a first filter disposed downstream of the first panel inlet and operable to remove particulates from the first airflow.

9. The energy recovery ventilation unit of claim 8, further comprising a second filter disposed downstream of the second panel inlet and operable to remove particulates from the second airflow.

10. The energy recovery ventilation unit of claim 1, wherein the controller is further operable to:
determine that a relative humidity of a portion of the second airflow discharged from the energy recovery ventilation core, a portion of the first airflow, or a combination of both of the portion of the second airflow discharged from the energy recovery ventilation core and the portion of the first airflow is less than a setpoint; and
initiate a mode of operation to generate the first output airflow, wherein the first output airflow comprises a relative humidity less than the combination of the portion of the second airflow discharged from the energy recovery ventilation core and the portion of the first airflow.

11. A method of operating in a dehumidification and ventilation mode, comprising:
introducing a first airflow into an energy recovery ventilation unit through a first panel inlet;
introducing a second airflow into the energy recovery ventilation unit through a second panel inlet, wherein the energy recovery ventilation unit comprises:
a first set of dampers disposed downstream of the first panel inlet; and
a second set of dampers disposed downstream of the second panel inlet, wherein each of the first set of dampers and the second set of dampers comprises a core damper and a bypass damper; and
a controller communicatively coupled to both the first set of dampers and the second set of dampers;
actuating the first set of dampers, by instruction from the controller, to transition from a closed position to an open position, wherein the first airflow is partitioned into a first portion and a second portion;
actuating the second set of dampers, by instruction from the controller, to transition from the closed position to the open position, wherein the second airflow is partitioned into a first portion and a second portion;
directing the first portion of both the first airflow and the second airflow into the energy recovery ventilation core, wherein the energy recovery ventilation core is configured to facilitate both heat transfer and mass transfer between the first portions of both the first airflow and the second airflow;
directing the second portion of the first airflow into a first lower section of the energy recovery ventilation unit;
directing the second portion of the second airflow into a second lower section of the energy recovery ventilation unit, wherein a partition extends from a bottom of the energy recovery ventilation unit to the energy recovery ventilation core defining the first lower section and the second lower section, wherein the bypass damper of the first set of dampers provides fluid communication between the first panel inlet and the first lower section, and wherein the bypass damper of the second set of dampers provides fluid communication between the second panel inlet and the second lower section;
directing a combination of the first portion of the second airflow discharged from the energy recovery ventilation core and the second portion of the first airflow to flow through an evaporator disposed within the first lower section;
directing a combination of the first portion of the first airflow discharged from the energy recovery ventilation core and the second portion of the second airflow to flow through a condenser disposed within the second lower section; and
generating a first output airflow by removing moisture from the combination of the first portion of the second airflow discharged from the energy recovery ventilation core and the second portion of the first airflow.

12. The method of claim 11, further comprising transferring heat from the combination of the first portion of the second airflow discharged from the energy recovery ventilation core and the second portion of the first airflow to a flow of refrigerant in a secondary evaporator to generate the first output airflow.

13. The method of claim 12, further comprising transferring heat from the first output airflow to the flow of refrigerant as the first output airflow passes through a primary evaporator.

14. The method of claim 13, further comprising transferring heat from the flow of refrigerant to the first output airflow as the first output airflow passes through a secondary condenser, wherein at least two members selected from the group consisting of the secondary evaporator, the primary evaporator, and the secondary condenser are combined into a single coil pack.

15. The method of claim 11, further comprising generating a second output airflow by transferring heat from a flow of refrigerant in a primary condenser to the combination of the first portion of the first airflow discharged from the energy recovery ventilation core and the second portion of the second airflow.

16. The method of claim 15, further comprising discharging the second output airflow out of the energy recovery ventilation unit to an unconditioned space, wherein the second output airflow comprises a temperature greater than the second airflow.

17. The method of claim 11, further comprising determining a pressure across the energy recovery ventilation core with a pressure differential sensor, wherein the pressure differential sensor comprises a first probe and a second probe, wherein the first probe is disposed upstream of an energy recovery ventilation core disposed in the energy recovery ventilation unit and the second probe is disposed downstream of the energy recovery ventilation core, wherein at least one of the first set of dampers and the second set of dampers is configured to actuate in response to determining the pressure across the energy recovery ventilation core.

18. The method of claim 11, further comprising receiving a relative humidity measurement from a first sensor disposed between the first panel inlet and the energy recovery ventilation core.

19. The method of claim 18, further comprising receiving a relative humidity measurement from a second sensor disposed between the energy recovery ventilation core and the evaporator within a first lower section of the housing.

20. The method of claim 19, further comprising:
    determining that the relative humidity of the first airflow or an airflow introduced into the first lower section is less than a setpoint; and
    initiating a mode of operation to generate the first output airflow.

* * * * *